(12) United States Patent
Mammou et al.

(10) Patent No.: US 12,175,716 B2
(45) Date of Patent: Dec. 24, 2024

(54) PREDICTIVE CODING FOR POINT CLOUD COMPRESSION

(71) Applicant: Apple Inc., Cupertino, CA (US)

(72) Inventors: Khaled Mammou, Vancouver (CA); David Flynn, Munich (DE); Alexandros Tourapis, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/545,925

(22) Filed: Dec. 19, 2023

(65) Prior Publication Data

US 2024/0127491 A1 Apr. 18, 2024

Related U.S. Application Data

(63) Continuation of application No. 17/225,081, filed on Apr. 7, 2021, now Pat. No. 11,887,345.

(60) Provisional application No. 63/006,608, filed on Apr. 7, 2020.

(51) Int. Cl.
*G06T 9/40* (2006.01)

(52) U.S. Cl.
CPC ....................................... *G06T 9/40* (2013.01)

(58) Field of Classification Search
None
See application file for complete search history.

(56) References Cited

U.S. PATENT DOCUMENTS

| 11,887,345 B2 | 1/2024 | Mammou et al. |
| 2019/0080483 A1 | 3/2019 | Mammou et al. |
| 2020/0175726 A1 | 6/2020 | Kuma et al. |
| 2021/0104075 A1 | 4/2021 | Mammou et al. |
| 2021/0248784 A1* | 8/2021 | Gao .......................... G06T 9/40 |
| 2021/0312670 A1 | 10/2021 | Mammou et al. |
| 2022/0159312 A1* | 5/2022 | Oh .......................... G06T 9/004 |

(Continued)

FOREIGN PATENT DOCUMENTS

WO WO 2021142361 7/2021

OTHER PUBLICATIONS

[No Author Listed], "Description of Core Experiment 13.22 for G-PCC: Improvements on tree-based geometry coding," ISO/IEC JTC 1/SC 29/WG 11, N18902, Oct. 21, 2019, 5 pages.

(Continued)

*Primary Examiner* — James A Thompson
(74) *Attorney, Agent, or Firm* — Fish & Richardson P.C.

(57) ABSTRACT

A system receives encoded data regarding a points in a point cloud. The data includes a prediction tree having a nodes generated based on spatial information regarding the points and properties of a sensor system that obtained the spatial information. A value of each node represents first spatial coordinates of a respective one of the points according to a first coordinate system, and the value of at least a first node in the prediction tree is determined based on ancestor nodes of the first node and the properties of the sensor system. The system decodes the data to determine first data, including the first spatial coordinates of at least some of the points, and quantization parameters associated with the first spatial coordinates. The system determines second data based on the first data, including second spatial coordinates of at least some of the points according to a second coordinate system.

20 Claims, 17 Drawing Sheets

(56) References Cited

U.S. PATENT DOCUMENTS

| | | | |
|---|---|---|---|
| 2022/0358686 A1 | 11/2022 | Lasserre et al. | |
| 2022/0376702 A1 | 11/2022 | Lasserre et al. | |
| 2023/0005190 A1* | 1/2023 | Sugio | G06T 9/40 |

OTHER PUBLICATIONS

[No Author Listed], "Information technology—MPEG-I (Coded Representation of Immersive Media)—Part 9: Geometry-based Point Cloud Compression," Draft International Standard G-PCC—ISO/IEC DIS 23090-9, Jun. 24, 2020, 127 pages.

[No Author Listed], "The present state of ultra-high definition television," Report ITU-R BT.2246-5, International telecommunication Union, ITU-R Radio communication sector of ITU, Jul. 2015, 92 pages.

danielnouri.org [online], "HypotApx: hypotenuse approximation," Internet archive: Wayback Machine URL <https://web.archive.org/web/20120424191431/http://danielnouri.org/docs/SuperColliderHelp/BinaryOps/hypotApx.html>, retrieved on Sep. 15, 2021, <http://danielnouri.org/docs/SuperColliderHel p/BinaryOps/hypotApx.html>, 1 page.

diversifiedvideosoultions.com [online], "DVS UHD HDR-10," DVS, Internet archive: Wayback Machine URL <https://web.archive.org/web/20190407035727/https://www.diversifiedvideosolutions.com/dvs_uhdhdr-10.html>, retrieved on Sep. 15, 2021, <https://www.diversifiedvideosolutions.com/dvs_uhdhdr-10.html>, 8 pages.

Dubrulle et al., "A Class of Numerical Methods for the Computation of Pythagorean Sums," IBM Journal of Research and Development, Nov. 1983, 27(6), 582-589.

International Preliminary Report on Patentability in International Appln. No. PCT/US2021/026282, mailed Oct. 20, 2022, 10 pages.

Lasserre et al., "[CE 13.22 related] An improvement of the planar coding mode the angular code mode," MPEG Meeting, ISO/IEC JTV1/SC29/WG11, Oct. 2, 2019, 33 pages.

Moler et al., "Replacing Square Roots by Pythagorean Sums," IBM Journal of Research and Development, Nov. 1983, 27(6), 577-581.

PCT International Search Report and Written Opinion in International Appln. No. PCT/US2021/026282, dated Jun. 24, 2021, 17 pages.

stackflow.com [online], "Fast Hypotenuse Algorithm for Embedded Processor?," Aug. 17, 2010, retrieved Aug. 23, 2021, retrieved from URL <https://stackoverflow.com/questions/3506404/fast-hypotenuse-algorithm-for-embedded-processor>, 8 pages.

U.S. Appl. No. 62/909,693, Mammou et al., "Predictive coding for point cloud compression," filed Oct. 2, 2019, 29 pages.

wikipedia.org [online], "atan2," Jul. 29, 2021, retrieved on Aug. 23, 2021, retrieved from URL<https://en.wikipedia.org/wiki/Atan2?>, 11 pages.

wikipedia.org [online], "Cordic," Aug. 23, 2021, retrieved on Aug. 23, 2021, retrieved from URL <https://en.wikipedia.org/wiki/CORDIC>, 17 pages.

wikipedia.org [online], "Hypot," Jan. 7, 2021, retrieved on Aug. 23, 2021, retrieved from URL <https://en.wikipedia.org/wiki/Hypot>, 4 pages.

\* cited by examiner

```
                                    ┌── 1000
                                    ▼

┌─────────────────────────────────────────────────────┐
│ Receive first data regarding a plurality of points  │
│ in a three-dimensional point cloud, including first │
│ spatial coordinates of at least some of the points  │
│ according to a first coordinate system              │
│                        1002                         │
└─────────────────────────────────────────────────────┘
                          │
                          ▼
┌─────────────────────────────────────────────────────┐
│ Determine second data regarding the plurality of    │
│ points based on the first data, including second    │
│ spatial coordinates of at least some of the points  │
│ according to a second coordinate system, and        │
│ one or more quantization parameters                 │
│                        1004                         │
└─────────────────────────────────────────────────────┘
                          │
                          ▼
┌─────────────────────────────────────────────────────┐
│ Encode the second data, including generating a      │
│ prediction tree having a plurality of nodes         │
│                        1006                         │
└─────────────────────────────────────────────────────┘
```

*FIG. 10A*

PREDICTIVE CODING FOR POINT CLOUD COMPRESSION

CROSS-REFERENCE TO RELATED APPLICATION

This application is a continuation of and claims priority to U.S. patent application Ser. No. 17/225,081, filed Apr. 7, 2021, which claims priority to U.S. Provisional Patent Application No. 63/006,608, filed Apr. 7, 2020, the entire contents of which is incorporated herein by reference.

TECHNICAL FIELD

This disclosure relates generally to compression and decompression of point clouds comprising a plurality of points, each having associated spatial and/or attribute information.

BACKGROUND

Various types of sensors, such as light detection and ranging (LIDAR) systems, 3-D-cameras, 3-D scanners, etc. may capture data indicating positions of points in three dimensional space, for example positions in the X, Y, and Z planes. Also, such systems may further capture attribute information in addition to spatial information for the respective points, such as color information (e.g., RGB values), intensity attributes, reflectivity attributes, motion related attributes, modality attributes, or various other attributes. In some circumstances, additional attributes may be assigned to the respective points, such as a time-stamp when the point was captured. Points captured by such sensors may make up a "point cloud" including a set of points each having associated spatial information and one or more associated attributes. In some circumstances, a point cloud may include thousands of points, hundreds of thousands of points, millions of points, or even more points. Also, in some circumstances, point clouds may be generated, for example in software, as opposed to being captured by one or more sensors. In either case, such point clouds may include large amounts of data and may be costly and time-consuming to store and transmit.

SUMMARY

This disclosure describes predictive coding techniques for compressing or otherwise encoding information for point clouds, such as spatial or other geometric information or other attribute values. In some embodiments, a prediction tree can be generated to predict information for individual points in a point cloud. A prediction tree can include, for example, an indication of one or more prediction techniques, and one or more ancestor nodes that can be used in conjunction with the prediction techniques to predict information regarding one or more points. In some embodiments, a prediction tree can be generated based on known or assumed information regarding a sensor system that was used to obtain information regarding the points of the point cloud (e.g., a LIDAR system). This can provide specific technical benefits, such as improving the compression efficiency of the encoding process, and/or reducing the computation complexity and the latency associated with the encoding and/or decoding process. In some embodiments, the prediction tree can be encoded to signal the point cloud information, and subsequently can be decoded to reconstitute the point cloud at a destination.

In an aspect, a method includes receiving, by a computer system, first data regarding a plurality of points in a three-dimensional point cloud, where the first data is based on one or more measurements obtained by a sensor system, and where the first data include first spatial coordinates of at least some of the points according to a first coordinate system; determining, by the computer system, second data regarding the plurality of points based on the first data, where the second data includes second spatial coordinates of at least some of the points according to a second coordinate system different from the first coordinate system, and one or more quantization parameters associated with the second spatial coordinates; and encoding, by the computer system, the second data, where encoding the second data includes generating a prediction tree having a plurality of nodes, where a value of each node in the prediction tree represents the second spatial coordinates of a respective one of the plurality of points, and where the value of at least a first node in the prediction tree is determined based on the value of one or more ancestor nodes of the first node and one or more properties of the sensor system.

Implementations of this aspect can include one or more of the following features.

In some implementations, the first coordinate system can be a Cartesian coordinate system.

In some implementations, the second coordinate system can be a spherical coordinate system.

In some implementations, the second spatial coordinates can be quantized according to the one or more quantization parameters.

In some implementations, the one or more quantization parameters can include one or more quantization step sizes with respect to one or more dimensions of the second coordinate system.

In some implementations, the sensor system can include one or more light detection and ranging (LIDAR) sensors.

In some implementations, the one or more properties of the sensor system can represent a rotational speed of one or more light emitters in the one or more LIDAR sensors.

In some implementations, the one or more properties of the sensor system can represent a physical arrangement of one or more light emitters in the one or more LIDAR sensors.

In some implementations, the one or more properties of the sensor system can represent a pattern of emission of one or more light emitters in the one or more LIDAR sensors.

In some implementations, the plurality of nodes of the prediction tree can be arranged according to a plurality of branches. Each branch can correspond to a different light emitter in the one or more LIDAR sensors.

In some implementations, the second data can include one or more residual values. The one or more residual values can be determined based on a difference between (i) a first location of a point represented by one or more of the first spatial coordinates for that point and (ii) a second location of that point estimated based on one or more of the second spatial coordinates for that point.

In some implementations, encoding the second data can include storing the plurality of residual values.

In another aspect, a method includes receiving, by a computer system, encoded data regarding a plurality of points in a three-dimensional point cloud, where the encoded data includes a prediction tree having a plurality of nodes generated based on spatial information regarding the plurality of points, and an indication representing one or more properties of a sensor system that obtained the spatial information, where a value of each node in the prediction tree represents first spatial coordinates of a respective one of the plurality of points according to a first coordinate system, and where the value of at least a first node in the prediction tree is determined based on a value of one or more ancestor nodes of the first node and the one or more properties of the sensor system; decoding, by the computer system, the encoded data to determine first data regarding the plurality of points, where the first data includes the first spatial coordinates of at least some of the points, and one or more quantization parameters associated with the first spatial coordinates; determining, by the computer system, second data regarding the plurality of points based on the first data, where the second data includes second spatial coordinates of at least some of the points according to a second coordinate system different from the first coordinate system; and generating, by the computer system, a representation of the three-dimensional point cloud based on the second data.

Implementations of this aspect can include one or more of the following features.

In some implementations, the first coordinate system can be a spherical coordinate system.

In some implementations, the second coordinate system can be a Cartesian coordinate system.

In some implementations, the first spatial coordinates can be scaled according to the one or more quantization parameters.

In some implementations, the one or more quantization parameters can include one or more quantization step sizes with respect to one or more dimensions of the first coordinate system.

In some implementations, the sensor system ca include one or more light detection and ranging (LIDAR) sensors.

In some implementations, the one or more properties of the sensor system can represent a rotational speed of one or more light emitters in the one or more LIDAR sensors.

In some implementations, the one or more properties of the sensor system can represent a physical arrangement of one or more light emitters in the one or more LIDAR sensors.

In some implementations, the one or more properties of the sensor system can represent a pattern of emission of one or more light emitters in the one or more LIDAR sensors.

In some implementations, the plurality of nodes of the prediction tree can be arranged according to a plurality of branches. Each branch can correspond to a different light emitter in the one or more LIDAR sensors.

In some implementations, the second data can include one or more first residual values. Determining the second data can additionally include decoding a second residual value according to the second coordinate system, and adding the one or more first residual values to the second residual value.

In some implementations, the plurality of nodes of the prediction tree can be arranged according to a plurality of branches. Decoding the encoded data can include decoding each of the nodes of a first branch prior to decoding each of the nodes of second branches.

In some implementations, the plurality of nodes of the prediction tree can be arranged according to a plurality of branches. Decoding the encoded data can include prioritizing a decoding of the nodes according to a hierarchical level of each of the nodes in the prediction tree.

In some implementations, generating the representation of the three-dimensional point cloud can include at least one of generating virtual reality content or augmented reality content.

Other implementations are directed to systems, devices, and non-transitory, computer-readable media having instructions stored thereon, that when executed by one or more processors, cause the one or more processors to perform operations described herein.

The details of one or more embodiments are set forth in the accompanying drawings and the description below. Other features and advantages will be apparent from the description and drawings, and from the claims.

BRIEF DESCRIPTION OF DRAWINGS

FIG. 10A is a flowchart diagram of an example process for encoding information regarding a plurality of points in a three-dimensional point cloud.

Figure 1:
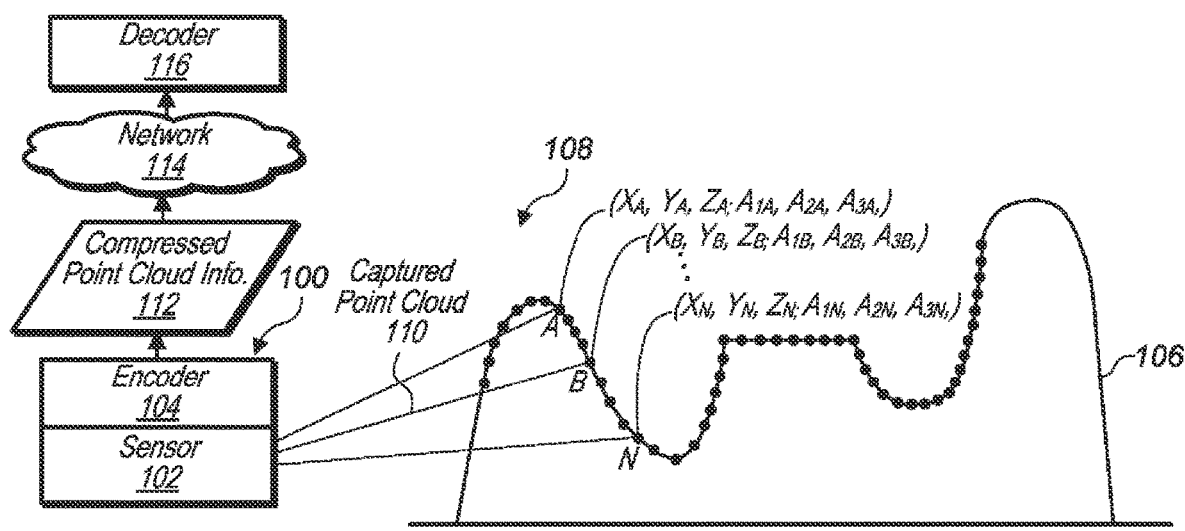
FIG. 1 is a diagram of an example system including a sensor that captures information for points of a point cloud and an encoder that compresses attribute information and/or spatial information of the point cloud, where the compressed point cloud information is sent to a decoder.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be\ described or claimed as "configured to" perform a task or tasks. In such contexts, "configured to" is used to connote structure by indicating that the units/ circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

As data acquisition and display technologies have become more advanced, the ability to capture point clouds including thousands or millions of points in 2-D or 3-D space, such as via LIDAR systems, has increased. Also, the development of advanced display technologies, such as virtual reality or augmented reality systems, has increased potential uses for point clouds. However, point cloud files are often very large and may be costly and time-consuming to store and transmit. For example, communication of point clouds over private or public networks, such as the Internet, may require considerable amounts of time and/or network resources, such that some uses of point cloud data, such as real-time uses, may be limited. Also, storage requirements of point cloud files may consume a significant amount of storage capacity of devices storing the point cloud files, which may also limit potential applications for using point cloud data.

In some embodiments, an encoder can be used to generate a compressed point cloud to reduce costs and time associated with storing and transmitting large point cloud files. In some embodiments, a system can include an encoder that compresses attribute information and/or spatial information (also referred to herein as geometry information) of a point cloud file such that the point cloud file can be stored and transmitted more quickly than non-compressed point clouds and in a manner such that the point cloud file can occupy less storage space than non-compressed point clouds. In some embodiments, compression of spatial information and/or attributes of points in a point cloud can enable a point cloud to be communicated over a network in real-time or in near real-time. For example, a system can include a sensor that captures spatial information and/or attribute information about points in an environment where the sensor is located, where the captured points and corresponding attributes make up a point cloud. The system can also include an encoder that compresses the captured point cloud attribute information. The compressed attribute information of the point cloud can be sent over a network in real-time or near real-time to a decoder that decompresses the compressed attribute information of the point cloud. The decompressed point cloud can be further processed, for example to make a control decision based on the surrounding environment at the location of the sensor. The control decision can then be communicated back to a device at or near the location of the sensor, where the device receiving the control decision implements the control decision in real-time or near real-time.

In some embodiments, the decoder can be associated with an augmented reality system and the decompressed spatial and/or attribute information can be displayed or otherwise used by the augmented reality system. In some embodiments, compressed attribute information for a point cloud can be sent with compressed spatial information for points of the point cloud. In other embodiments, spatial information and attribute information can be separately encoded and/or separately transmitted to a decoder.

In some embodiments, a system can include a decoder that receives one or more point cloud files including compressed attribute information via a network from a remote server or other storage device that stores the one or more point cloud files. For example, a 3-D display, a holographic display, or a head-mounted display can be manipulated in real-time or near real-time to show different portions of a virtual world represented by point clouds. In order to update the 3-D display, the holographic display, or the head-mounted display, a system associated with the decoder can request point cloud files from the remote server based on user manipulations of the displays, and the point cloud files can be transmitted from the remote server to the decoder and decoded by the decoder in real-time or near real-time. The displays can then be updated with updated point cloud data responsive to the user manipulations, such as updated point attributes.

In some embodiments, a system, can include one or more LIDAR systems, 3-D cameras, 3-D scanners, etc., and such sensor devices can capture spatial information, such as X, Y, and Z coordinates for points in a view of the sensor devices. In some embodiments, the spatial information can be relative to a local coordinate system or can be relative to a global coordinate system (e.g., a Cartesian coordinate system can have a fixed reference point, such as a fixed point on the earth, or can have a non-fixed local reference point, such as a sensor location).

In some embodiments, such sensors can also capture attribute information for one or more points, such as color attributes, reflectivity attributes, velocity attributes, acceleration attributes, time attributes, modalities, and/or various other attributes. In some embodiments, other sensors, in addition to LIDAR systems, 3-D cameras, 3-D scanners, etc., can capture attribute information to be included in a point cloud. For example, in some embodiments, a gyroscope or accelerometer, can capture motion information to be included in a point cloud as an attribute associated with one or more points of the point cloud. For example, a vehicle equipped with a LIDAR system, a 3-D camera, or a 3-D scanner can include the vehicle's direction and speed in a point cloud captured by the LIDAR system, the 3-D camera, or the 3-D scanner. For instance, when points in a view of the vehicle are captured, they can be included in a point cloud, where the point cloud includes the captured points and associated motion information corresponding to a state of the vehicle when the points were captured.

In some embodiments, attribute information can comprise string values, such as different modalities. For example attribute information can include string values indicating a modality such as "walking," "running," "driving," etc. In some embodiments, an encoder can include a "string-value" to integer index, where certain strings are associated with certain corresponding integer values. In some embodiments, a point cloud can indicate a string value for a point by including an integer associated with the string value as an attribute of the point. The encoder and decoder can both store a common string value to integer index, such that the decoder can determine string values for points based on looking up the integer value of the string attribute of the point in a string value to integer index of the decoder that matches or is similar to the string value to integer index of the encoder.

In some embodiments, an encoder can compress and encode geometric or other spatial information of a point cloud in addition to compressing attribute information for attributes of the points of the point cloud.

In some embodiments, some applications may be sensitive to the latency or time that is taken to encode and decode point cloud. While some point cloud encoding techniques may implement features that provide good compression results, such as octrees utilized in Geometry-based Point Cloud Compression (G-PCC), the time to encode and decode point cloud data may limit the utilization of the compression in latency sensitive applications. For example, while octree techniques may provide excellent compression results for dense point cloud, the gain for a sparse point cloud (e.g., a sparse LIDAR point cloud) may not be as effective, as the computational complexity for building the octree and computing features of the octree (e.g., such as neighborhood occupancy information) may result in computational costs that outweigh the obtained compression gains. Furthermore, in some scenarios, some coding techniques, like octree-based coding, may incur a high latency (e.g., by using a high number of points before the compression/decompression process could start). Predictive coding techniques, in various embodiments, may provide various performance benefits, including low latency implementations, which can achieve more performant computational costs and time costs.

For example, predictive coding techniques as discussed below may be implemented for low latency or other latency sensitive applications, allow for low delay streaming, and be implemented with low complexity decoding.

FIG. 1 illustrates a system including a sensor that captures information for points of a point cloud and an encoder that compresses spatial and/or attribute information of the point cloud, where the compressed spatial and/or attribute information is sent to a decoder.

The system 100 includes a sensor 102 and an encoder 104. The sensor 102 captures a point cloud 110 including points representing a structure 106 in a view 108 of the sensor 102. For example, in some embodiments, the structure 106 can be a mountain range, a building, a sign, an environment surrounding a street, or any other type of structure. In some embodiments, a captured point cloud, such as the captured point cloud 110, can include spatial and attribute information for the points included in the point cloud. For example, point A of captured point cloud 110 can includes X, Y, Z coordinates and attributes 1, 2, and 3. In some embodiments, attributes of a point can include attributes such as R, G, B color values, a velocity at the point, an acceleration at the point, a reflectance of the structure at the point, a time stamp indicating when the point was captured, a string-value indicating a modality when the point was captured, for example "walking," or other attributes. The captured point cloud 110 can be provided to the encoder 104, where the encoder 104 generates a compressed version of the point cloud (e.g., compressed point cloud information 112) that is transmitted via a network 114 to a decoder 116. In some embodiments, a compressed version of the point cloud, such as the compressed point cloud information 112, can be included in a common compressed point cloud that also includes compressed spatial information for the points of the point cloud or, in some embodiments, compressed spatial information and compressed attribute information can be communicated as separate files.

In some embodiments, the encoder 104 can be integrated with the sensor 102. For example, the encoder 104 can be implemented in hardware or software included in a sensor device, such as the sensor 102. In other embodiments, the encoder 104 can be implemented on a separate computing device that is proximate to the sensor 102.

Figure 2A:
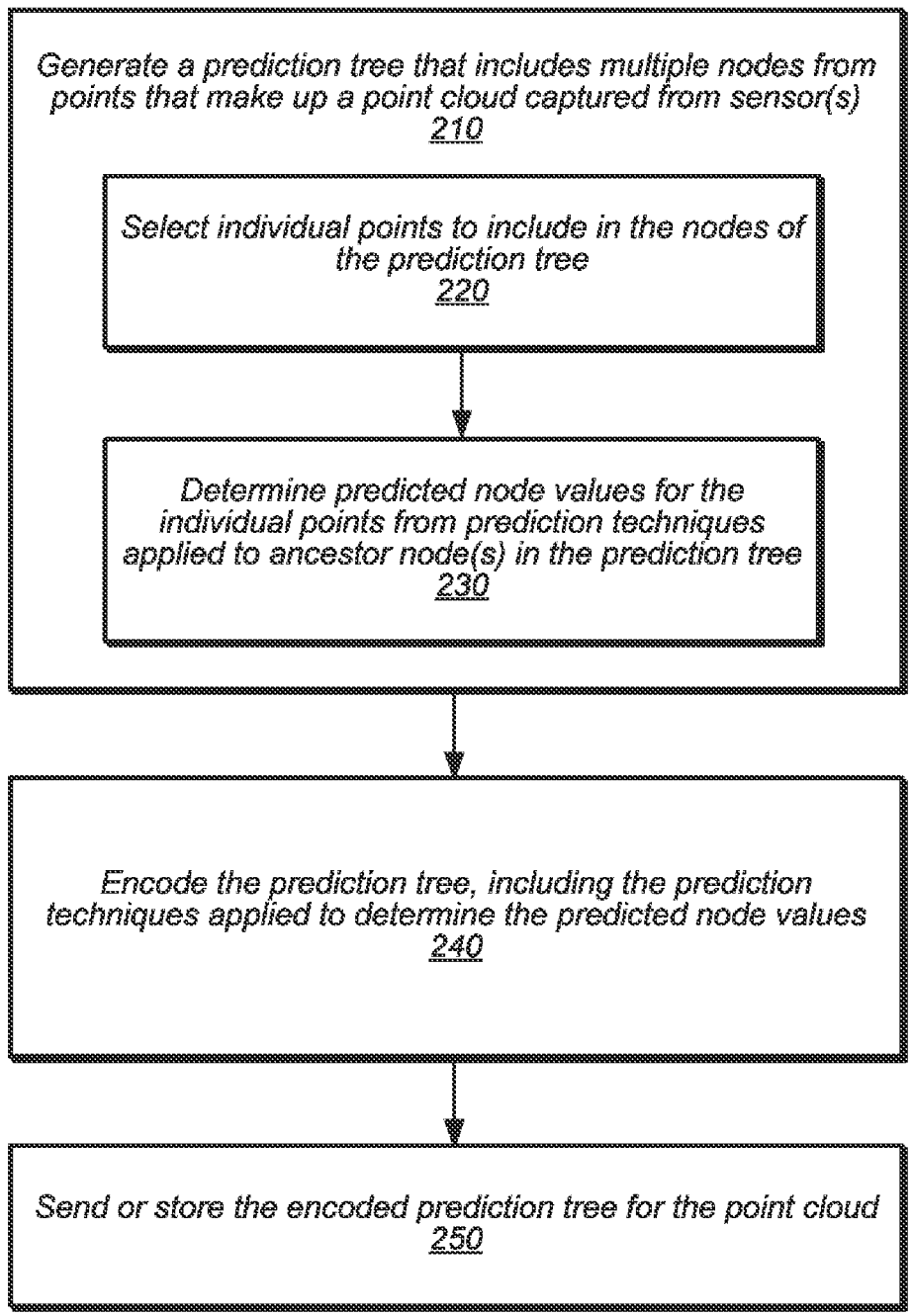
FIG. 2A is a flowchart diagram of example techniques for predictive coding for point clouds.

FIG. 2A is a high-level flowchart illustrating various techniques for predictive coding for point clouds, according to some embodiments. As indicated at step 210, a prediction tree can be generated that includes multiple nodes from points that make up a point cloud captured from sensor(s). A prediction tree can serve as a prediction structure, where each point in the point cloud is associated with a node (sometimes referred to as a vertex) of the prediction tree. In some embodiments, each node can be predicted from only the ancestors of the node in the tree (e.g., parent nodes, grandparent nodes, etc. of the predicted node).

Figure 3:
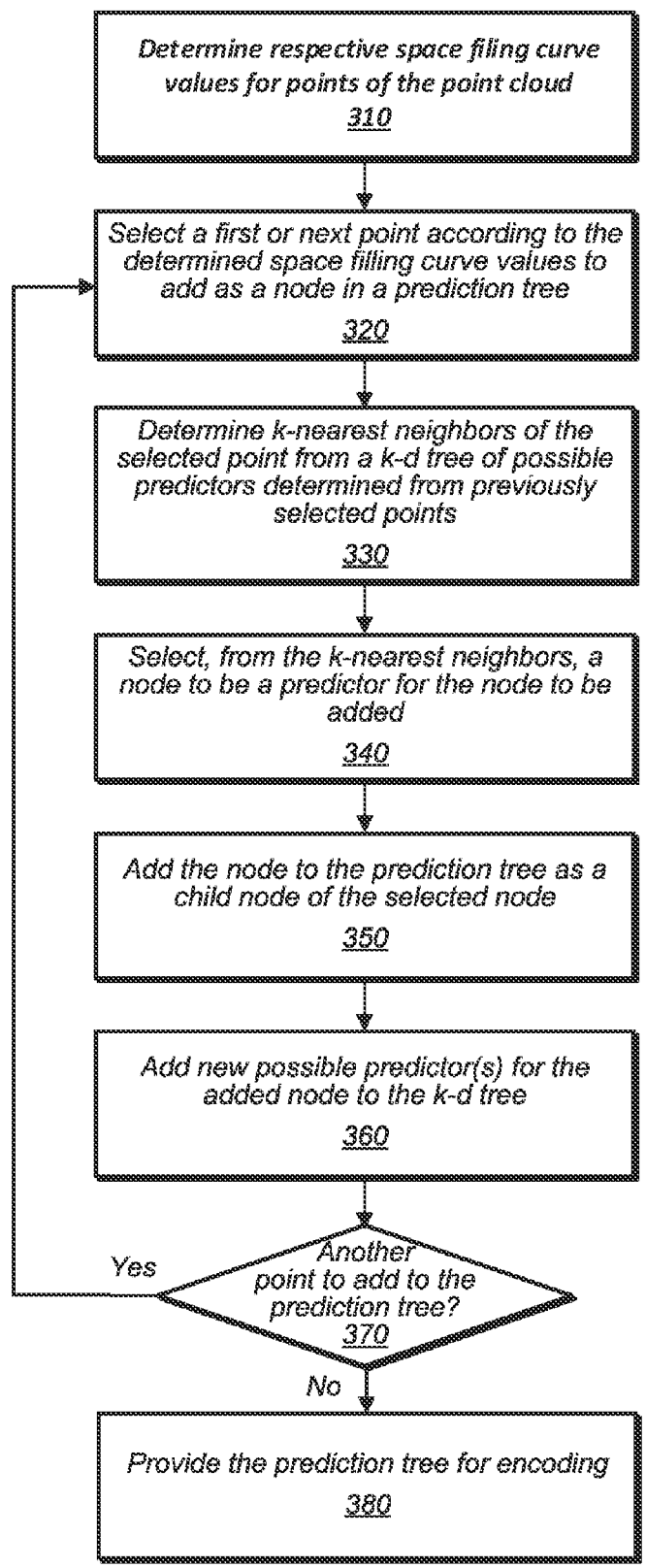
FIG. 3 is a flowchart diagram of example techniques for generating a prediction tree according to a space-filling curve.
Figure 4:
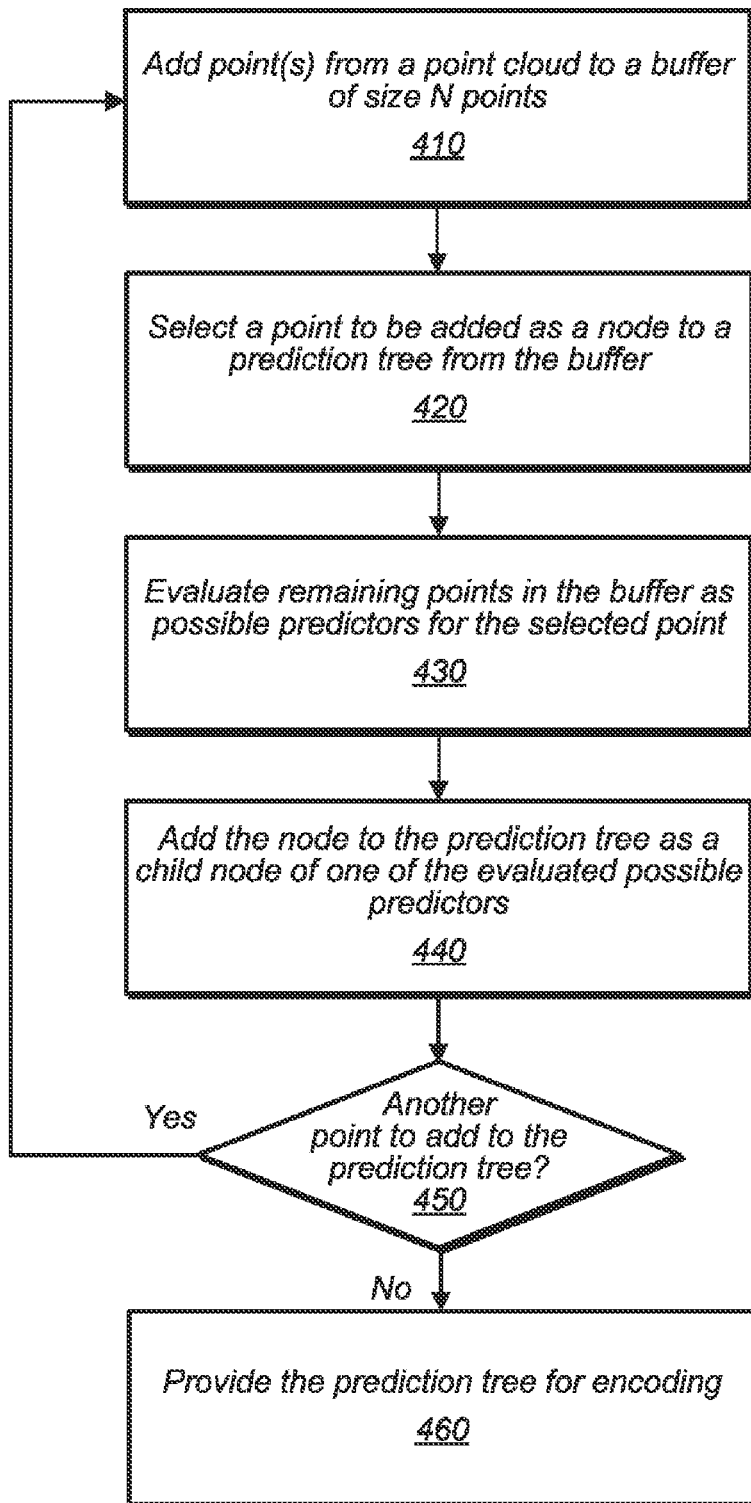
FIG. 4 is a flowchart diagram of example techniques for generating a prediction tree according to a buffer of possible predictors.

As part of generating the prediction tree, individual points of the point cloud can be selected for inclusion in the prediction tree, as indicated at step 220. As indicated at step 230, predicted node values can be determined for the individual points from prediction techniques applied to ancestor nodes in the prediction tree. FIGS. 3 and 4, discussed below, provide examples prediction tree generation techniques.

Various prediction techniques can be implemented to predict a node from ancestor nodes. These prediction techniques can be signaled as prediction modes or prediction indicators (e.g., mapped to prediction mode values "0"= prediction technique A, "1"= prediction technique B, and so on). In some embodiments, a node in the prediction tree (corresponding to one point in the point cloud) may not have a prediction technique as it may be the first or root node of the prediction tree. In some embodiments, the prediction mode for such a node can be indicated as "none" or "root. The actual information (e.g., spatial information and/or attribute information) for such a node can be encoded instead of the prediction information encoded for other nodes in the tree that is used to derive the actual information.

Figure 2B:
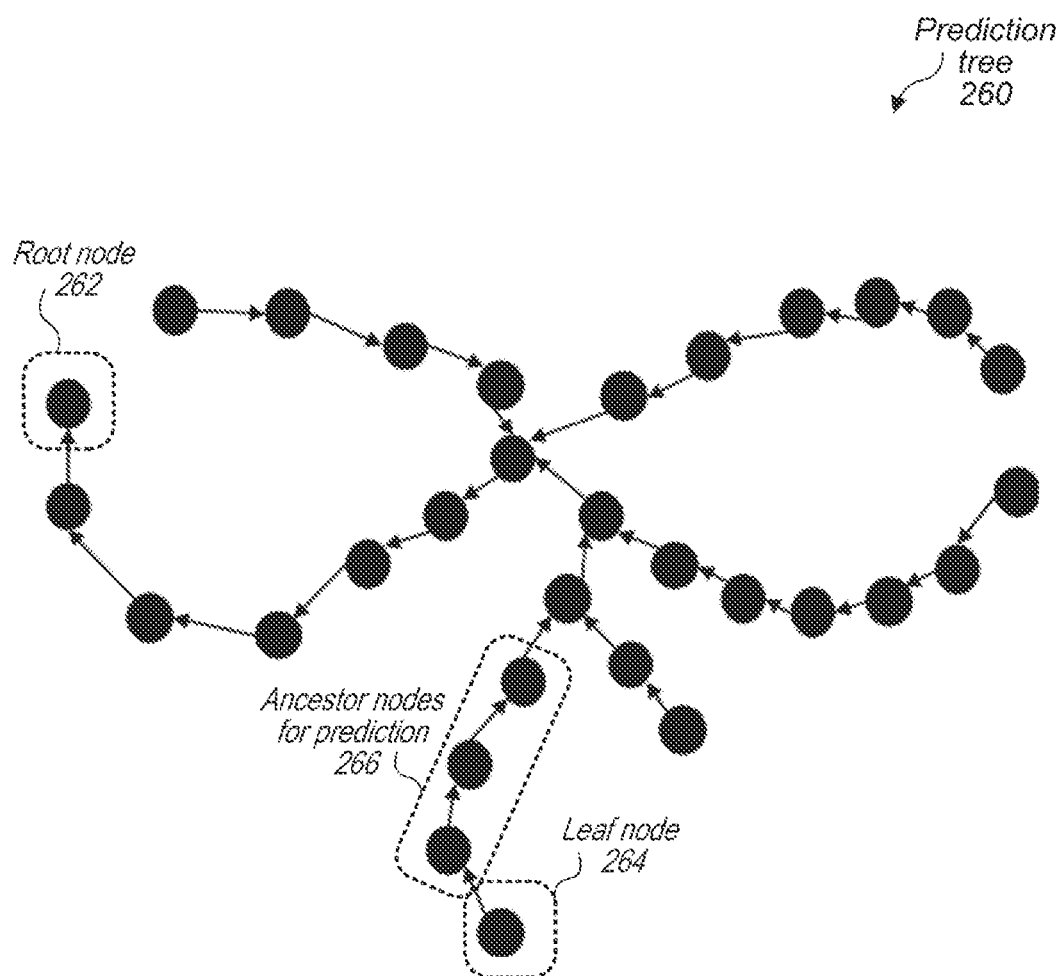
FIG. 2B is diagram of an example prediction tree.

As illustrated in FIG. 2B, a prediction tree 260 can include various nodes that are predicted according to a prediction technique applied to one or more ancestor nodes, indicated by the arrows. For example, leaf node 264 can be predicted by ancestor nodes 266, according to various ones of the prediction techniques discussed below. Some nodes, like root node 262, may not be predicted and can instead be encoded as part of prediction tree 260 using the actual values.

In some embodiments, delta prediction can be implemented or supported as a prediction technique. Delta prediction can use a position of a parent node of a current node as a predictor the current node.

In some embodiments, linear prediction can be implemented or supported as a prediction technique. For example, in linear prediction, a point "p0" can be the position of a parent node and "p1" can be the position of a grandparent node. The position of a current node can be predicted as (2×p0−p1).

In some embodiments, parallelogram prediction may be implemented or supported as a prediction technique. For example, in parallelogram prediction, "p0" can be the position of the parent node, "p1" can be the position of the grandparent node, and "p2" can be the position of the great-grandparent node. A current node's position can be determined as (p0+p1−p2).

In some embodiments, polar prediction can be implemented or supported as a prediction technique. For example, in polar prediction, $(\theta_0, r_0, z_0)$ can be the polar coordinates of the parent node and $(\theta_1, r_1, z_1)$ can be the polar coordinates of the grandparent node. The position of the current node can be predicted as $$\left(2\theta_0 - \theta_1, \frac{r_0 + r_1}{2}, \frac{z_0 + z_1}{2}\right).$$

In some embodiments, modified polar prediction can be implemented or supported as a prediction technique. For example, in modified polar prediction, $(\theta_0, r_0, z_0)$ can be the polar coordinates of the parent node and $(\theta_1, r_1, z_1)$ can be the polar coordinates of the grandparent node. The position of the current node can be predicted as $(2\theta_0-\theta_1, r_0, z_0)$.

In some embodiments, average prediction can be implemented or supported as a prediction technique. For example, in average prediction, "p0" can be the position of the parent node and "p1" can be the position of the grandparent node. The position of the current node can be predicted as ((p0+p1)/2).

In some embodiments, average prediction of order 3 can be implemented or supported as a prediction technique. For example, in average prediction of order 3, "p0" can be the position of the parent node, "p1" can be the position of the grandparent node, and "p2" can be the position of the great-grandparent node. The position of the current node can be predicted as ((p0+p1+p2)/3).

In some embodiments, average prediction of order k can be implemented or supported as a prediction technique. For example, in average prediction of order k, the positions of ancestor nodes of the current node can be averaged up to the order k ancestor nodes.

In some embodiments, the choice of the prediction technique to be applied for each node of the prediction tree can be determined according to a rate-distortion optimization procedure. In some embodiments, the choice can be adaptive per node or per group of nodes. In some embodiments, the choice can be signaled explicitly in the bitstream or can be implicitly derived based on the location of the node if the prediction graph and decoded positions and prediction modes of the node ancestors.

As indicated at step 240, the prediction tree can be encoded, including the prediction techniques applied to determine the predicted node values. For example, a node can be encoded along with a number of child nodes, and with an indication of respective prediction modes that are used to determine each child node. In some embodiments, the prediction mode can be the same for each child, different for each child, or independently determined for each child (even if determined to be the same). In various embodiments, the prediction tree can be encoded by traversing the tree in a predefined order (e.g., depth first, breath first) and encoding for each node the number of its children. In some embodiments, the positions of the nodes can be encoded by encoding first the chosen prediction mode and then the obtained residuals after prediction. In some embodiments, the number of children, the prediction mode and the prediction residuals could be entropy encoded (e.g., arithmetically encoded) in order to further exploit statistical correlations. In some embodiments, the residuals can be encoded by compressing the sign of each residue, the position of the most significant bit and the binary representation of the remaining bits, in some embodiments. In some embodiments, correlations between the X, Y, Z coordinates could be exploited by using a different entropy/arithmetic context based on the encoded values of the first encoded components.

As indicated at step 250, the encoded prediction tree for the point cloud can be sent or stored (e.g., according to the various examples discussed above with regard to FIG. 1) and below with regard to FIGS. 11, 12, and 13A.

FIG. 3 is a high-level flowchart illustrating various techniques for generating a prediction tree according to a space filling curve. As indicated at step 310, a space filling curve (e.g., a Morton order) can be used to determine values (e.g., Morton codes) for points of a point cloud, in some embodiments. As indicated at step 320, a first or next point according to the space filling curve values can be selected to add as a node in a prediction tree.

As indicated at step 330, k-nearest neighbors of the selected point can be determined from a k-dimensional (k-d) tree of possible predictors determined from previously selected points. As indicated at step 340, from the k-nearest neighbors, a node can be selected to a predictor for the node to be added. For example, the node can be selected according to the magnitude of prediction residuals, the number of children the node has, and/or the frequency of the chosen prediction mode. As indicated at step 350, the child node can be added to the prediction tree as a child node of the selected node. New possible predictor(s) (e.g., predicted values generated from the prediction techniques discussed herein) for the added node can be added to the k-d tree, as indicated at step 360. As indicated at step 380, if another point remains to be added to the prediction tree, then the features of the technique can be repeated.

When all points have been added, the prediction tree can be provided for encoding, as indicated at step 380.

In some embodiments, the points can be decomposed into various levels of detail (LODs) before performing the techniques illustrated in FIG. 3. For example, the LODs can be encoded starting from the coarsest LOD to the finest LOD. In such an embodiment, the potential predictors and predicted positions can be added in the k-d tree. In some embodiments, different quantization parameters can be used for a different LOD (e.g., a smaller quantization step for the coarsest LOD) in order to obtain better rate-distortion (RD) performance. In some embodiments, functionalities of temporal scalability, spatial scalability, quality scalability, and progressive transmission can be implemented utilizing LODs or other hierarchical prediction structure. In this way, the coarse LOD can be streamed and decoded first, and then progressively more granular LODs may be streamed and decoded adaptively based on network conditions, terminal capabilities, and a distance of the point cloud to a viewer.

For a lower latency approach (e.g., when compared with the techniques of FIG. 3), an encoder can processes the input point cloud in the same order it is received. A limited buffering buffer N can be implemented that is measured in terms of the number of buffered points B is allowed (e.g., B=1024 points). In some embodiments, B can be a decoder parameter that can be adjusted depending on the stringency of the application latency requirements. In some embodiments, when looking for the best predictor for each vertex, the encoder can consider only the points that are in the buffer. FIG. 4 is a high-level flowchart illustrating various techniques for generating a prediction tree according to a buffer of possible predictors.

As indicated at step 410, point(s) from a point cloud can be added to a buffer of size N points. As indicated at step 420, a point to be added as a node to a prediction tree can be selected from the buffer. As indicated at step 430, remaining points in the buffer can be evaluated as possible predictors for the selected point. For instance, as discussed above with regard to FIG. 3, the remaining points in the buffer can be evaluated according to the magnitude of prediction residuals, the number of children the corresponding node of the points has, and/or the frequency of the chosen prediction mode.

As indicated at step 440, the node can be added to the prediction tree as a child node of one of the evaluated possible predictors. If another point remains to be added to the prediction tree, then as indicated by the positive exit from step 450, steps 410 through 440 can be repeated. As indicated in step 460, when all points have been added to the prediction tree, then the prediction tree can be provided for encoding.

In some embodiments, the prediction tree can be used to compress or otherwise encode spatial information, such as geometry, or various other attributes (e.g., color information). In some scenarios, the same predictors of different nodes can be used and potentially explicitly encoded in the bitstream for the attributes. The scalability and low-latency properties can be directly be inherited from the prediction tree generation strategy.

In an alternative embodiment, the predictive coding technique can be applied only for the spatial information, while alternative techniques can be used for encoding attributes (e.g., lifting, Region Adaptive Hierarchical Transform (RAHT) or prediction scheme for the attributes according to the G-PCC attributes encoding scheme). In order to enable low latency application, the Morton re-ordering of the points can applied before the attributes coding would be disabled.

Figure 5:
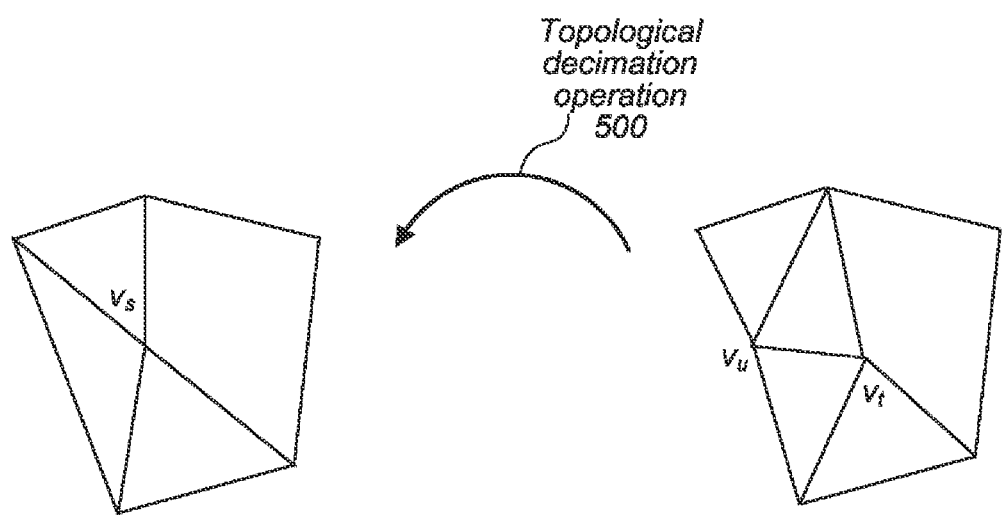
FIG. 5 is a diagram of an example topological decimation operation.

In some embodiments, hierarchical prediction and lifting schemes (e.g., defined in G-PCC) can be modified to exploit the prediction scheme to guide the decimation and nearest neighbor's detection processes. For example, the decimation process can be applied by using edge collapse operators or any other topological decimation operator. FIG. 5 is a logical diagram illustrating an example topological decimation operation. Topological decimation operation 500 can collapse or combine $v_u$ and $v_t$ into $v_s$.

In some embodiments, the criteria to choose the edge-collapse operation or other topological decimation operations to be applied to generate LODs can be guided by distance criteria (e.g., the distance between the merged points) and/or explicit information included by the encoder in the bitstream. In some embodiments, the nearest neighbor search can be restricted to the neighbors in the tree structure or can use the prediction tree structure to accelerate it.

Figure 6:
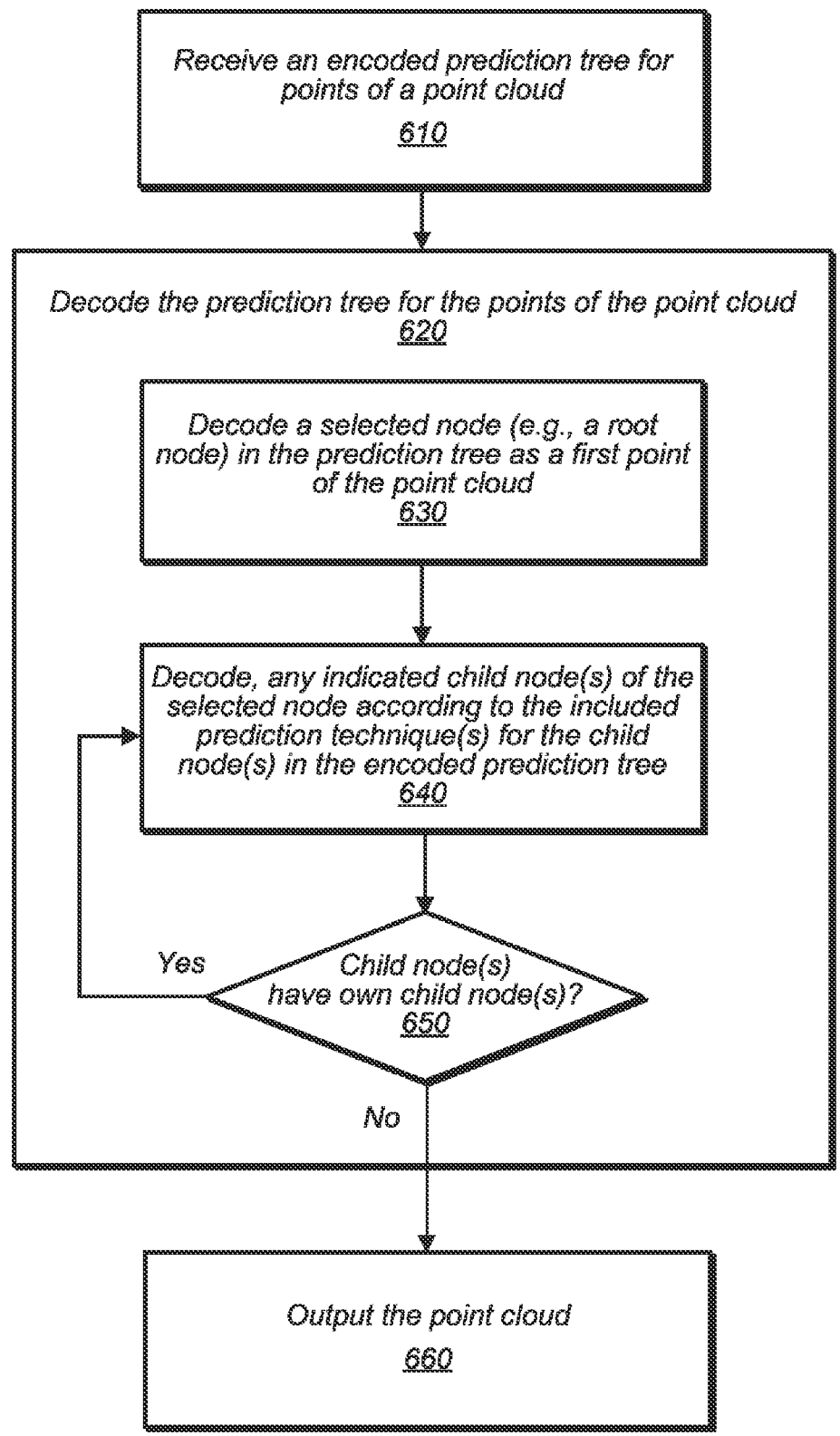
FIG. 6 is a flowchart diagram of example techniques for decoding a prediction tree for a point cloud.

FIG. 6 is a high-level flowchart illustrating various techniques for decoding a prediction tree for a point cloud. As indicated at step 610, an encoded prediction tree for points of a point cloud can be received. As indicated at step 620, the prediction tree for the points of the point cloud can be decoded. For example, techniques to undo entropy or other encoding techniques can be performed.

In at least some embodiments, the encoded prediction tree can include enough information to generate the prediction tree from the decoded contents of the prediction tree (e.g., without performing the same tree generation techniques discussed above with regard to FIGS. 3 and 4). For example, as indicated at step 630, a selected node (e.g., a root node) can be decoded as a first point in the point cloud. Then, as indicated at step 640, any child node(s) of the selected node can be decoded according to the included prediction techniques for the child nodes.

In some embodiments, a determination can be made, as indicated at step 650, as to whether any of the child node(s) have child nodes of their own. For example, the included number of child nodes can be considered for each included point. If any child nodes exist, then the techniques at step 640 can be performed again. Once complete, the decoded point cloud from the prediction tree may be output, as indicated at step 660 (e.g., for further processing, display, and/or storage).

In some embodiments, a prediction tree can be generated based on known or assumed information regarding a sensor system that was used to obtain information regarding the points of the point cloud. For example, if a LIDAR system was used to generate points representing a particular subject (e.g., an object in the field of view of the LIDAR system), a prediction tree can be generated based on properties of the LIDAR system, such as the speed at which the light emitters of the LIDAR system rotate when surveying its environment, the number of light emitters in the LIDAR system, the physical arrangement of those light emitters, and/or the pattern of emission of those light emitters. This can provide specific technical benefits, such as improving the compression efficiency of the encoding process, and/or reducing the computation complexity and the latency associated with the encoding and/or decoding process.

Figure 7:
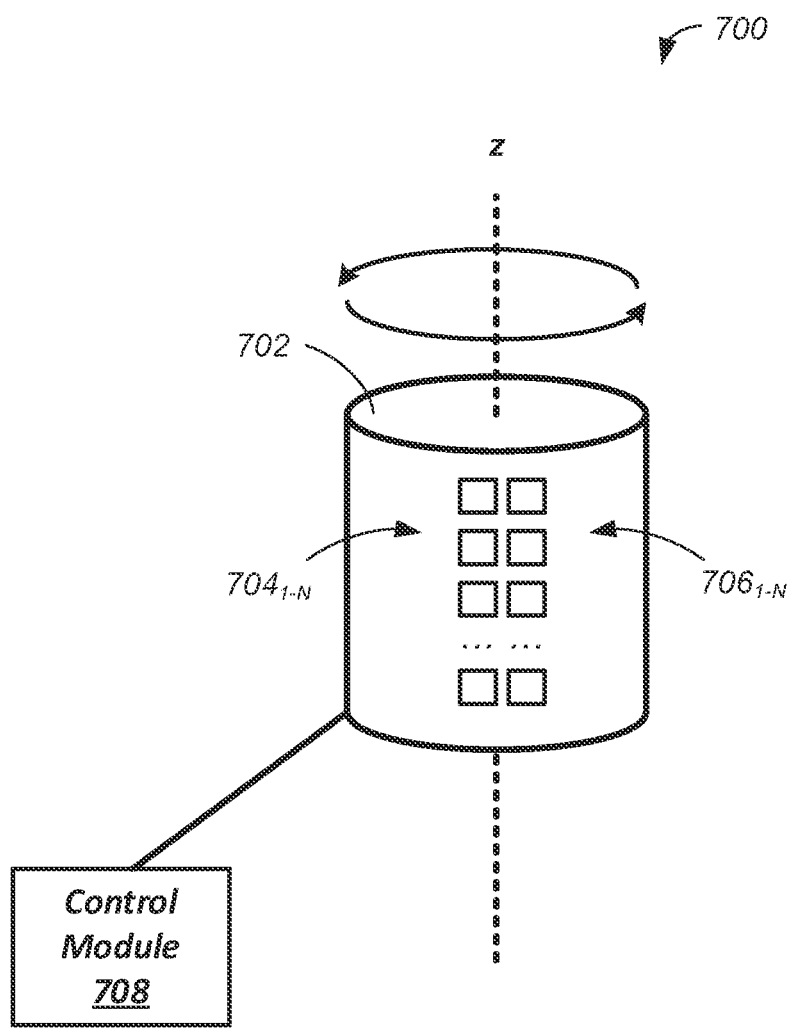
FIG. 7 is a diagram of a simplified example LIDAR system.

FIG. 7 shows a simplified example of a LIDAR system 700. The LIDAR system 700 includes a rotating scanning module 702, and one or more light emitters 704 and one or more light detectors 706 mounted to the scanning module 702. The LIDAR system 700 also includes a control module 708 communicatively coupled to the light emitters 704 and the light detectors 706.

During operation of the LIDAR system 700, the scanning module 702 rotates (e.g., about a z-axis) to scan the environment. As the scanning module 702 rotates, the light emitters 704 emit light (e.g., one or more laser beams), and the light detectors 706 detect light that is reflected from the environment (e.g., by one or more objects in the environment) back towards the scanning module 702. Differences in the return times and/or wavelengths of the reflected light can be used to make digital 3-D representations of the environment.

The components of the LIDAR system 700 can be controlled using the control module 708. Further, the control module 708 can process data received by the LIDAR system 700 (e.g., survey data from one or more of the light detectors 706). Further, the control module 708 can record data for further processing, and/or transmit data to another device for further processing. In some embodiments, the data collected by the LIDAR system 700 can be encoded by an encoder (e.g., to facilitate the distribution of the data to other systems), and subsequently decoded by a decoder (e.g., to facilitate use of the data by other systems). In some embodiments, the LIDAR system 700 can be used to generate spatial information regarding one or more objects in an environment, such as in the form of a point cloud.

The operation of the LIDAR system 700 can be represented using a mathematical model. For example, a LIDAR system 700 can have N light emitters 704 (e.g., N=16, 32, 64, or any other number of light emitters) rotating about the z-axis according to an azimuth angle $\phi$ (e.g., as shown in FIG. 8A).

Each light emitter 704 can have a different respective elevation $\theta(i)_{i=1 \ldots N}$ (e.g., the angle of a beam of light 802 emitted by the light emitter relative to the x-y plane). As an illustrative example, FIG. 8B shows a configuration in which 16 light emitters emit beams of light according to a different respective elevations.

Further, each light emitter can have a different respective height $\varsigma(i)_{i=1 \ldots N}$ (e.g., a z-offset of the light emitter 704 from a reference point, such an origin of the coordinate system).

Figure 8A:
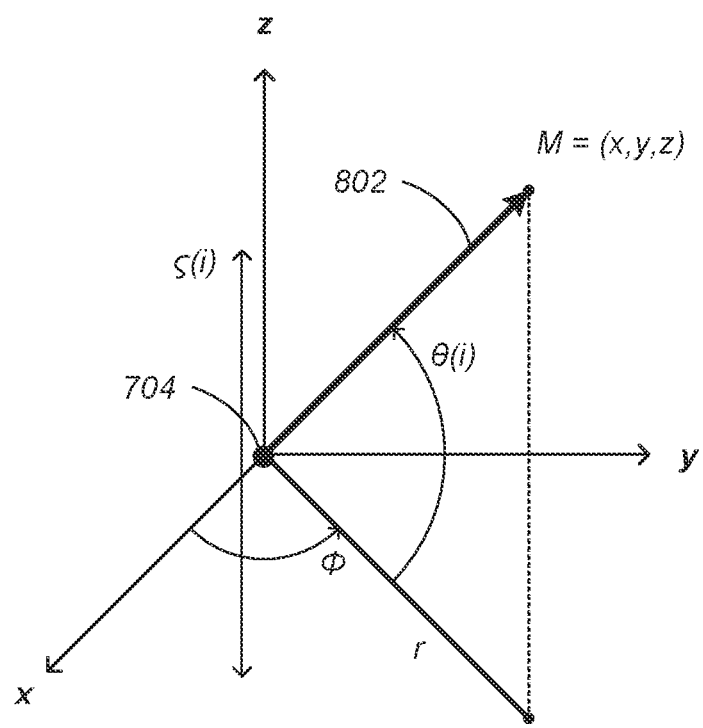
FIG. 8A-8B are diagrams of example LIDAR system models.
Figure 8B:
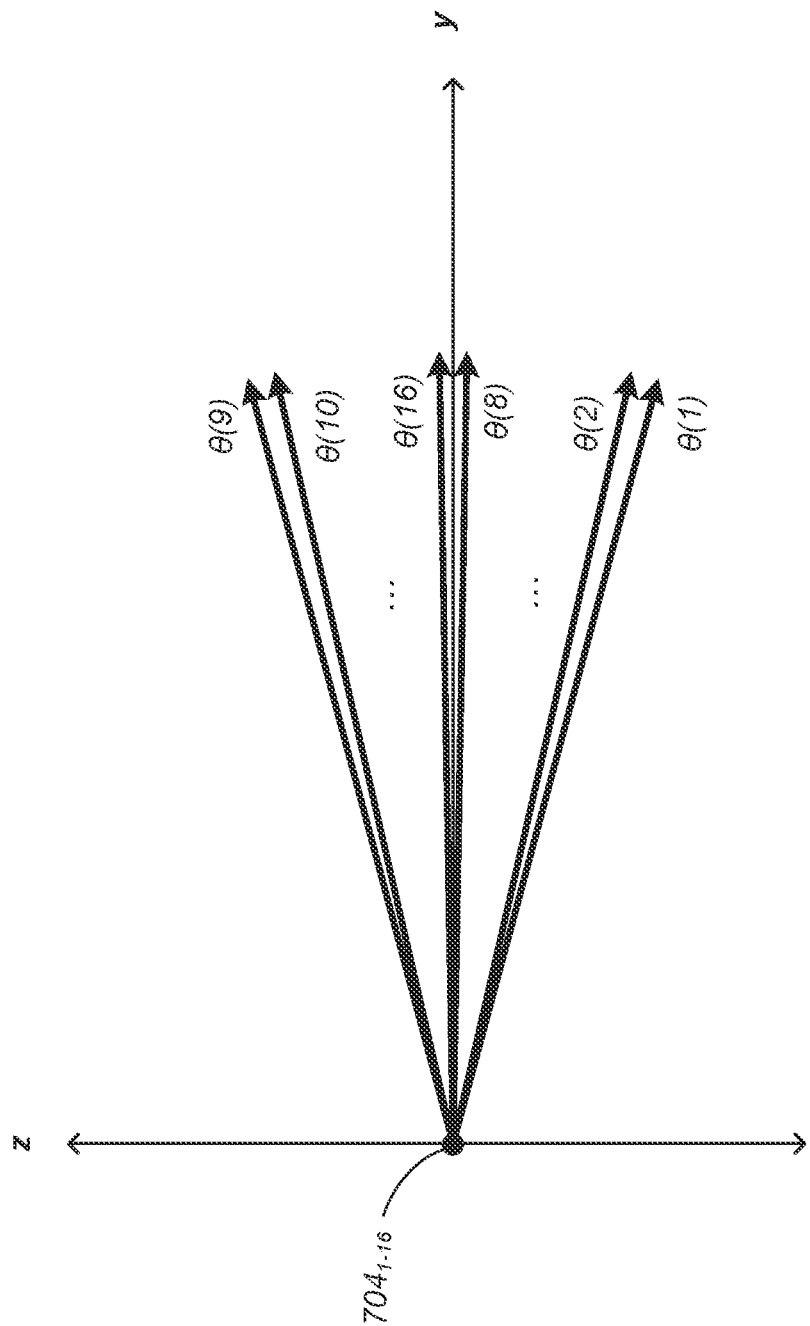

In the example shown in FIG. 8A, a beam of light i (emitted by one of the light emitters 704) hits a point M in the environment with Cartesian integer coordinates (x, y, z). The position of M can be modeled with three parameters (r, $\phi$, i) with respect to a spherical coordinate system, where:

$$r = \sqrt{x^2 + y^2} \quad \text{(Eq. 1)}$$

$$\phi = \operatorname{atan2}(y, x) \quad \text{(Eq. 2)}$$

$$i = \arg\min_{j=1 \ldots N} \{z + \varsigma(j) - r \times \tan(\theta(j))\} \quad \text{(Eq. 3)}$$

The function atan2 is defined as the angle in the Euclidean plane, given in radians, between the positive x-axis and the ray to the point (x, y)≠(0, 0).

In some implementations, one or more of these parameters can be quantized. This can be beneficial, for example, in reducing the complexity of the model. For example, the quantized version of (r, $\phi$, i) can be denoted by ($\tilde{r}$, $\tilde{\phi}$, i), and the three integers $\tilde{r}$, $\tilde{\phi}$ and i can computed as follows:

$$\tilde{r} = \operatorname{floor}\left(\frac{\sqrt{x^2+y^2}}{q_r} + o_r\right) = \operatorname{hypot}(x, y) \quad \text{(Eq. 4)}$$

$$\tilde{\phi} = \operatorname{sign}(\operatorname{atan2}(y, x)) \times \left(\frac{|\operatorname{atan2}(y, x)|}{q_\phi} + o_\phi\right) \quad \text{(Eq. 5)}$$

$$i = \arg\min_{j=1 \ldots N} \{z + \varsigma(j) - r \times \tan(\theta(j))\} \quad \text{(Eq. 6)}$$

The function hypot is a mathematical function defined to calculate the length of the hypotenuse r of a right-angle triangle, where $r = \sqrt{x^2 + y^2}$.

($q_r$, $o_r$) and ($q_\phi$, $o_\phi$) are quantization parameters controlling the precision of $\phi$ (e.g., $q_\phi = 2\pi \times 2^{-16}$, $o_\phi = 0.5$) and $\tilde{r}$ (e.g., $q_r = 1$, $o_\phi = 0.5$), respectively.

sign(t) is a function that return 1 if t is positive and (−1) otherwise.

|t| is the absolute value of t.

Various quantization techniques can be used to determine quantized parameters ($\tilde{r}$, $\tilde{\phi}$, i). For example, parameters can be quantized in a similar manner as described with respect to the High Efficiency Video Coding (HEVC) technical standard, in which a parameter p can be quantized to a value q according to a quantization parameter qp, using the following relationship:

$$q = \operatorname{sign}(p) * ((\operatorname{abs}(p) * \operatorname{scaleConstant}[qp\% \ 6] + \operatorname{offset}) >> (15 + qp/6)) \quad \text{(Eq. 7)}$$

where ScaleConstant is a 6 element table and offset is a rounding parameter that controls whether the value should be rounded up or down after quantization. The above model permits performing the quantization and dequantization without the need of division operations (e.g., qp/6 could be computed offline), reducing complexity. Dequantization in such a model can be performed equivalently using the following relationship:

$$p = \operatorname{Clip3}(p \ \operatorname{Min}, p \ \operatorname{Max}, ((q * \operatorname{levelScale}[qp\% \ 6] << (qP/6)) + (1 << (\operatorname{bdShift}-1))) >> \operatorname{bdShift}), \quad \text{(Eq. 8)}$$

where levelScale is a 6 element array that, in combination with the value of bdShift, inverses the scaling previously applied by the equivalent scaleConstant element and the right shift by 15. Clip3 is a function of the form:

$$\operatorname{Clip3}(x, y, z) = \begin{cases} x; & z < x \\ y; & z > y \\ z; & \text{otherwise} \end{cases} \quad \text{(Eq. 9)}$$

and pMin and pMax are the minimum and maximum allowed values for reconstructed parameter.

In some embodiments, a parameter p can be quantized to a value q according to a quantization parameter qp, using the following relationship, or an integer approximation thereof, as described in International App. No. PCT/US2021/012827 (the contents of which are incorporated by reference in their entirety):

$$\operatorname{stepSize} = (1 + 0.125 * \operatorname{mod}[qp, 8]) * 2^{\lfloor qp/8 \rfloor} \quad \text{(Eq. 10)}$$

$$q = \operatorname{sign}(p) * \operatorname{Round}(\operatorname{abs}(p) \div \operatorname{stepSize}) \quad \text{(Eq. 11)},$$

where stepSize is the quantization step size.

Dequantization in such a model can be performed equivalently using the following integer relationship:

$$\operatorname{stepSize}' = (8 + (qp\% \ 8)) << (qp/8) \quad \text{(Eq. 12)}$$

$$p = \operatorname{sign}(q) * ((\operatorname{abs}(q) * \operatorname{stepSize}' + 4) >> 3) \quad \text{(Eq. 13)}$$

In some embodiments, other quantization techniques can be used.

In some embodiments, instead of calculating hypot(x, y) in Eq. 4, hypot(x, y) can be approximated using a lower complexity technique (e.g., to reduce the computation resources required to perform the process). As an example, hypot(x, y) can be approximated using a polynomial approximate of the function $f(x, y) = |y|\sqrt{1 + (x/y)^2}$. As another example, hypot(x, y) can be approximated using a function hypotApx(x, y), where hypotApx(x, y)=abs(x)+abs(y)−((sqrt(2)−1)*min(abs(x), abs(y))) (e.g., as described in http://danielnouri.org/docs/SuperColliderHelp/BinaryOps/hypotApx.html). As another example, hypot(x, y) can be approximated using the relationship h=((sqrt(2)−1)*x)+y, where x and y are positive values, and x≤y (e.g., as described in https://stackoverflow.com/questions/3506404/fast-hypotenuse-algorithm-for-embedded-processor). As another example, hypot(x, y) can be approximated using a Moller-Morrison scheme (e.g., as described in https://ieeexplore.ieee.org/document/5390405). As another example, hypot (x, y) can be approximated using the Dubrulle method (e.g., as described in https://ieeexplore.ieee.org/document/5390406).

In some embodiments, a local search around the initial solution ($\tilde{r}$, $\tilde{\phi}$, i) could be applied to further refine the quantization. As an example, a quantization algorithm can include applying an exhaustive search in the set $\{\tilde{r}-\sigma(r), \ldots, \tilde{r}+\sigma(r)\} \times \{\tilde{\phi}-\sigma(\phi), \ldots, \tilde{\phi}+\sigma(\phi)\}$. The objective is to find ($\tilde{r}^*$, $\tilde{\phi}^*$, i*), which minimizes the reconstruction residuals ($r_x$, $r_y$, $r_z$) described below.

To avoid reconstruction mismatches due to the use of floating-point operations, the values of $\varsigma$ $(i)_{i=1 \ldots N}$ and tan $(\theta(i))_{i=1 \ldots N}$ can be pre-computed and quantized as follows:

$$\tilde{z}(i) = \text{sign}(\varsigma(i)) \times \text{floor}\left(\frac{|\varsigma(i)|}{q_\varsigma} + o_\varsigma\right) \quad \text{(Eq. 14)}$$

$$\tilde{t}(i) = \text{sign}(\varsigma(\tan(\theta(j)))) \times \text{floor}\left(\frac{|\tan(\theta(j))|}{q_\theta} + o_\theta\right) \quad \text{(Eq. 15)}$$

($q_\varsigma$, $o_\varsigma$) and ($q_\theta$, $o_\theta$) are quantization parameters controlling the precision of $\tilde{\varsigma}$ (e.g., $q_\varsigma = 2^3$, $o_\varsigma = 0.5$) and $\tilde{\theta}$ (e.g., $q_\theta = 2^{20}$, $o_\phi = 0.5$), respectively.

Various quantization techniques can be used to determine quantized parameters ($\tilde{z}$, $\tilde{t}$, i). For example, parameters can be quantized in a similar manner as described with respect to the HEVC technical standard, in which a parameter p can be quantized to a value q according to the following relationship:

$$q = \text{sign}(p)*((\text{abs}(p)*\text{scaleConstant}[qp\% \ 6] + \text{offset}) >> (15 + qp/6)) \quad \text{(Eq. 16)}$$

where ScaleConstant is a 6 element table and offset is a rounding parameter that controls whether the value should be rounded up or down after quantization. The above model permits performing the quantization and dequantization without the need of division operations (e.g., qp/6 could be computed offline), reducing complexity. Dequantization in such a model can be performed equivalently using the following relationship $$p = \text{Clip3}(p \text{ Min}, p \text{ Max}, ((q*\text{levelScale}[qp\% \ 6] << (qP/6)) + (1 << (\text{bdShift}-1))) >> \text{bdShift}) \quad \text{(Eq. 17)}$$

where levelScale is a 6 element array that, in combination with the value of bdShift, inverses the scaling previously applied by the equivalent scaleConstant element and the right shift by 15. Clip3 is a function of the form:

$$\text{Clip3}(x, y, z) = \begin{cases} x; & z < x \\ y; & z > y \\ z; & \text{otherwise} \end{cases} \quad \text{(Eq. 18)}$$

and pMin and pMax are the minimum and maximum allowed values for reconstructed parameter.

In some embodiments, a parameter p can be quantized to a value q according to a quantization parameter qp, using the following relationship, or an integer approximation thereof, as described International App. No. PCT/US2021/012827:

$$\text{stepSize} = (1 + 0.125*\text{mod}[qp, 8])*2^{\lfloor qp/8 \rfloor} \quad \text{(Eq. 19)}$$

$$q = \text{sign}(p)*\text{Round}(\text{abs}(p) \div \text{stepSize}) \quad \text{(Eq. 20)}$$

Dequantization in such a model can be performed equivalently using the following integer relationship:

$$\text{stepSize}' = (8 + (qp\% \ 8)) << (qp/8) \quad \text{(Eq. 21)}$$

$$p = \text{sign}(q)*((\text{abs}(q)*\text{stepSize}' + 4) >> 3) \quad \text{(Eq. 22)}$$

The reconstructed Cartesian coordinates can be determined as follows:

$$\hat{x} = \text{round}(\tilde{r} \times q_r \times \text{app\_cos}(\tilde{\phi} \times q_\phi)) \quad \text{(Eq. 23)}$$

$$\hat{y} = \text{round}(\tilde{r} \times q_r \times \text{app\_sin}(\tilde{\phi} \times q_\phi)) \quad \text{(Eq. 24)}$$

$$\hat{z} = \text{round}(\tilde{r} \times q_r \times \tilde{t}(i) \times q_\theta \tilde{z}(i) \times q\varsigma) \quad \text{(Eq. 25)}$$

The calculations above can be performed using either floating-point representation or fixed-point representation.

app_cos(.) and app_sin(.) are approximations of cos(.) and sin(.), respectively. The functions app_cos($\tilde{\phi} \times q_\phi$) and app_sin($\tilde{\phi} \times q_\phi$) can be implemented according to one or more approximation techniques, such as using a look-up table with linear (or any other) interpolation, the Coordinate Rotation Digital Computer (CORDIC algorithm), a polynomial approximation of the sine/cosine functions, or any combination thereof.

In some embodiments, ($\hat{x}$, $\hat{y}$, $\hat{z}$) may be different from (x, y, z) due to various reasons, such as quantization, approximations, model imprecision, and/or model parameters imprecisions.

The reconstruction residuals ($r_x$, $r_y$, $r_z$) can be determined as follows:

$$r_x = x - \hat{x} \quad \text{(Eq. 26)}$$

$$r_y = y - \hat{y} \quad \text{(Eq. 27)}$$

$$r_z = z - \hat{z} \quad \text{(Eq. 28)}$$

Example Encoder Operations

An encoder can encode information regarding the points in a point cloud based on the techniques and relationships described herein. An example encoding process is described in greater detail below.

An encoder encodes the model parameters $\tilde{t}(i)$ and $\tilde{z}(i)$ and the quantization parameters $q_r$, $q_\varsigma$, $q_\theta$ and $q_\phi$. In some embodiments, one or more of these parameters can be encoded as a fixed set for the entire point cloud. In some embodiments, one or more of these parameters can be individually encoded for different subsets of the point cloud. For example, one or more of these parameters can be encoded on a per frame, per slice, and/or per "group of points" basis. Further, parameter adjustment and/or updates can be encoded in the bitstream.

Next, the encoder applies a geometry predictive scheme to the representation ($\tilde{r}$, $\tilde{\phi}$, i). In some embodiments, the geometry predictive scheme can be similar to that shown and described with respect to FIGS. 2-6. For example, a predictive tree can be generated to predict information for individual points in a point cloud. A prediction tree can include, for example, an indication of one or more prediction techniques, and one or more ancestor nodes that can be used in conjunction with the prediction techniques to predict information regarding one or more points.

Further, a prediction tree can be generated based on known or assumed information regarding a sensor system that was used to obtain information regarding the points of the point cloud. For example, if a LIDAR system was used to generate points representing a particular subject (e.g., an object in the field of view of the LIDAR system), a prediction tree can be generated based on properties of the LIDAR system, such as the speed at which the light emitters of the LIDAR system rotate when surveying its environment, the number of light emitters in the LIDAR system, the physical arrangement of those light emitters, and/or the pattern of emission of those light emitters.

As an example, in some embodiments, the rotation speed of a LIDAR system's scanning module (e.g., the scanning module 702) around the z-axis can be constant. Therefore, the current $\tilde{\phi}(j)$ can be represented using the following predictor relationship:

$$\tilde{\phi}(j)=\tilde{\phi}(j-1)+\delta_\phi \qquad \text{(Eq. 29)},$$

where $\delta_\phi$ is a constant (e.g., corresponding to the rotational speed of the scanning module). In some embodiments, $\delta_\phi$ can be defined as another parameter of the LIDAR model (e.g., as shown and described with respect to FIGS. 8A and 8B).

In some embodiments, a light emitter can emit a beam of light that does not reflect from the environment (e.g., no light from that light beam returns to the LIDAR system). To take this possibility into account, the predictor relationship can be generalized as follows:

$$\tilde{\phi}(j)=\tilde{\phi}(j-1)+n(j)\times\delta_\phi \qquad \text{(Eq. 30)},$$

where n(j) is the number of skipped points (e.g., due to a lack of reflected light returning from those points). In some embodiments, n(j) can be explicitly written to the bitstream. In some embodiments, n(j) can be inferred from the context based on a deterministic strategy applied by both the encoder and the decoder.

In some embodiments, the predictor relationship can be generalized even further, to account for varying rotation speed of the scanning module of the LIDAR system. For example, the predictor relationship can be generalized as follows:

$$\tilde{\phi}(j)=\tilde{\phi}(j-1)+n(j)\times\delta_\phi(k) \qquad \text{(Eq. 31)}$$

where $(\delta_\phi(k))_{k=1\ldots K}$ are a set of potential rotational speeds the encoder could choose from. In some embodiments, the index k can be explicitly written to the bitstream. In some embodiments, the index k can be inferred from the context based on a deterministic strategy applied by both the encoder and the decoder.

The encoder can encode one or more of these parameters. For example, the encoder can encode the prediction tree, the prediction modes, and/or one or more of the ($\tilde{r}$, $\tilde{\phi}$, i) parameters on a per-node basis.

Next, the encoder encodes, with each node, the reconstruction residuals ($r_x$, $r_y$, $r_z$) (e.g., by using any entropy encoder, such as an arithmetic encoder).

In some embodiments, additional prediction of the reconstruction residuals can be considered (e.g., in addition to those described above). In some embodiments, any linear or non-linear predictors could be considered (e.g., in addition to those described above).

In some embodiments, the reconstruction residuals ($r_x$, $r_y$, $r_z$) can be encoded as a triplet or re-arranged differently at block level for better compression. For example, an encoder could obtain all of the $r_x$ values from all (or N) nodes and encode them first, then similarly encode all of the $r_y$ values, then similarly encode all of the $r_z$ values. The encoder can then move to the next group/block of points. In some embodiments, the encoder can use some of the encoded values (e.g., $r_x$ values) to predict or better choose the entropy encoding context for the remaining values (e.g., $r_y$ and $r_z$ values).

Example Decoder Operations

A decoder can decode encoded information regarding the points in a point cloud based on the techniques and relationships described herein. An example decoding process is described in greater detail below.

First, the decoder decodes the model parameters $\tilde{t}(i)$ and $\tilde{z}(i)$ and the quantization parameters $q_r$, $q_\varsigma$, $q_\theta$ and $q_\phi$.

Next, the decoder decodes the ($\tilde{r}$, $\tilde{\phi}$, i) parameters associated with the nodes according to the geometry predictive scheme (e.g., as shown and described with respect to FIGS. 2-6 and/or the example encoded operations above). For example, the decoder can decode a predictive tree, prediction modes, and/or one or more ($\tilde{r}$, $\tilde{\phi}$, i) parameters on a per-node basis that were encoded in the encoded information. Based on this decoded data, the decoder can compute reconstructed ($\tilde{r}$, $\tilde{\phi}$, i) parameters, as described above.

Next, the decoder computes the reconstructed coordinates ($\hat{x}$, $\hat{y}$, $\hat{z}$) as described above.

Next, the decoder decodes the residuals ($r_x$, $r_y$, $r_z$). As described in further detail below, in some embodiments, lossy compression could be supported by quantizing the reconstruction residuals ($r_x$, $r_y$, $r_z$).

Next, the decoder computers the original coordinates (x, y, z) as follows:

$$x=r_x+\hat{x} \qquad \text{(Eq. 32)}$$

$$y=r_y+\hat{y} \qquad \text{(Eq. 33)}$$

$$z=r_z+\hat{z} \qquad \text{(Eq. 34)}$$

Lossy Compression

In the examples described above, information regarding the points of a point cloud is encoded in a lossless manner. In some embodiments, information regarding the points of a point cloud can be encoded in a lossy manner. For example, lossy compression can be performed by applying quantization to the reconstruction residuals ($r_x$, $r_y$, $r_z$) or by dropping points. As another example, lossy compression can be performed by combining points (e.g., by first combining points, such as through weighed averaging of N points, then dropping all other points).

In some embodiments, the quantized reconstruction residuals can be computed as follows:

$$\tilde{r}_x = \text{sign}(r_x) \times \text{floor}\left(\frac{|r_x|}{q_x} + o_x\right) \qquad \text{(Eq. 35)}$$

$$\tilde{r}_y = \text{sign}(r_y) \times \text{floor}\left(\frac{|r_y|}{q_y} + o_y\right) \qquad \text{(Eq. 36)}$$

$$\tilde{r}_z = \text{sign}(r_z) \times \text{floor}\left(\frac{|r_z|}{q_z} + o_z\right), \qquad \text{(Eq. 37)}$$

where ($q_x$, $o_x$), ($q_y$, $o_y$) and ($q_z$, $o_z$) are quantization parameters controlling the precision of $\tilde{r}_x$, $\tilde{r}_y$ and $\tilde{r}_z$, respectively.

In some embodiments, Trellis quantization can be used to further improve the rate-distortion (RD) performance results.

Further, in some implementations, values can be quantized in a similar manner as described with respect to the HEVC technical standard, in which a value p can be quantized to a value q according to the following relationship:

$$q=\text{sign}(p)*((\text{abs}(p)*\text{scaleConstant}[qp\% \ 6]+\text{offset}))>> (15+qp/6)) \qquad \text{(Eq. 38)}$$

where ScaleConstant is a 6 element table and offset is a rounding parameter that controls whether the value should be rounded up or down after quantization. The above model permits performing the quantization and dequantization without the need of division operations (e.g., qp/6 could be computed offline), reducing complexity. Dequantization in such a model can be done performed using the following relationship:

$$p = \text{Clip3}(p\text{ Min}, p\text{ Max},((q^*\text{levelScale}[qp\%\ 6]<<(qP/6))+(1<<(\text{bdShift}-1)))>>\text{bdShift}) \quad \text{(Eq. 39)}$$

where levelScale is a 6 element array that, in combination with the value of bdShift, inverses the scaling previously applied by the equivalent scaleConstant element and the right shift by 15. Clip3 is a function of the form:

$$\text{Clip3}(x, y, z) = \begin{cases} x; & z < x \\ y; & z > y \\ z; & \text{otherwise} \end{cases} \quad \text{(Eq. 40)}$$

and pMin and pMax are the minimum and maximum allowed values for reconstructed parameter.

In some embodiments, a parameter p can be quantized to a value q according to a quantization parameter qp, using the following relationship, or an integer approximation thereof, as described in International App. No. PCT/US2021/012827:

$$\text{stepSize}=(1+0.125^*\text{mod}[qp,8])^*2^{\lfloor qp/8 \rfloor} \quad \text{(Eq. 41)}$$

$$q=\text{sign}(p)^*\text{Round}(\text{abs}(p)\div\text{stepSize}) \quad \text{(Eq. 42)}$$

Dequantization in such a model can be performed equivalently using the following integer relationship:

$$\text{stepSize}'=(8+(qp\%\ 8))<<(qp/8) \quad \text{(Eq. 43)}$$

$$p=\text{sign}(q)^*((\text{abs}(q)^*\text{stepSize}'+4)>>3) \quad \text{(Eq. 44)}$$

In some embodiments, quantization parameters can be explicitly signalled in the bitstream. In some embodiments, quantization parameters can be implicitly derived by the encoder and decoder based on the encoding/decoding context. In some embodiments, the values can change at sequence/frame/slice/block level. In some embodiments, the values can be set for the entire point cloud.

Low Complexity Prediction Tree Generation

Figure 9:
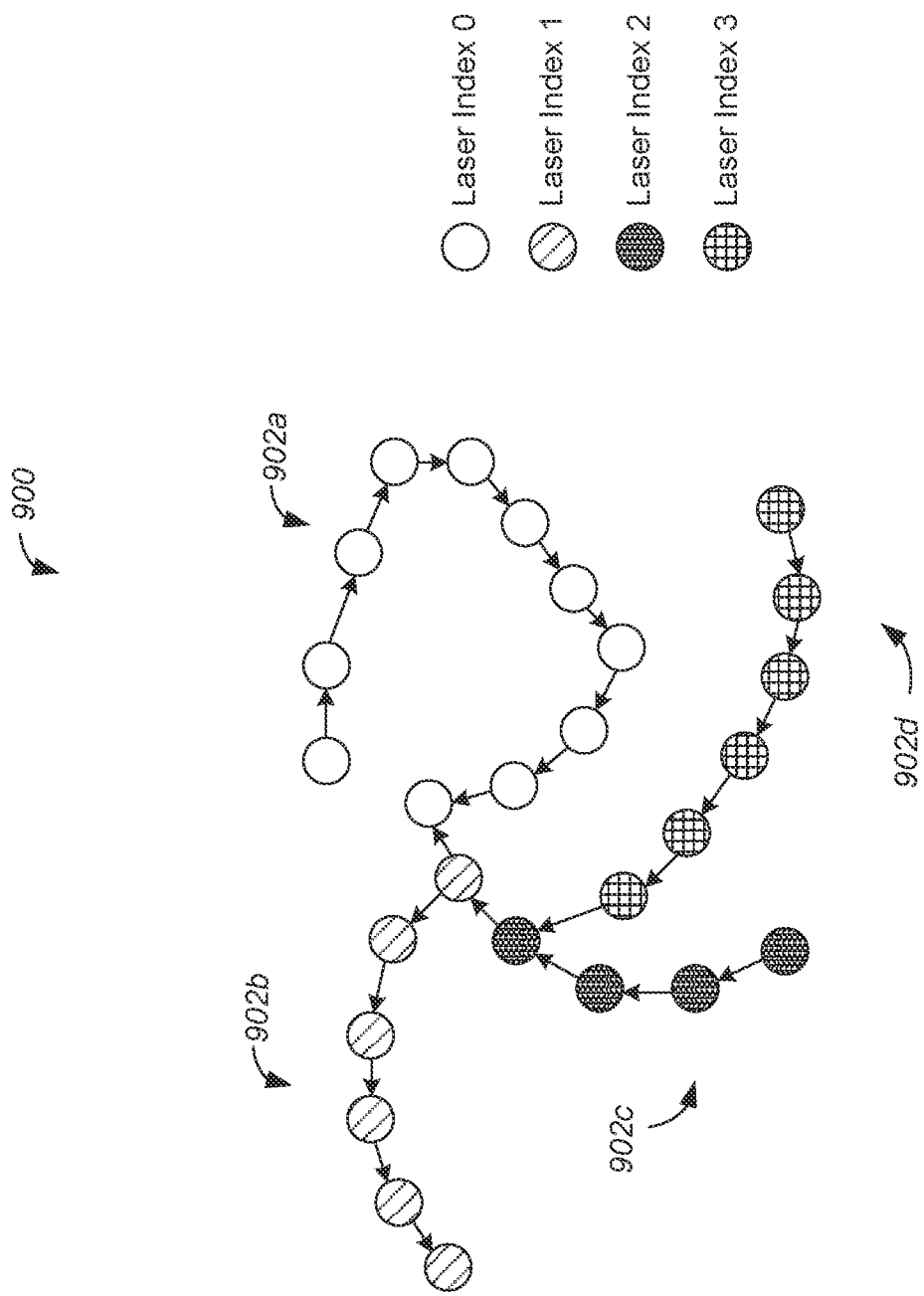
FIG. 9 is a diagram of an example prediction tree for encoding information regarding points in a three-dimensional point cloud.

In some embodiments, a prediction tree can be generated such that it represents points surveyed using multiple different light emitters. For each node in the prediction tree, the prediction tree can include information regarding a particular point (e.g., spatial information regarding the point) and an indication of the light emitter that we used to survey that point (e.g., a light emitter or laser emitter index). As an example, FIG. 9 shows a prediction tree 900 having a number of interconnected nodes. The nodes 902a correspond to points surveyed using a first laser emitter (e.g., index 0), the nodes 902b correspond to points surveyed using a second laser emitter (e.g., index 1), the nodes 902c correspond to points surveyed using a third laser emitter (e.g., index 2), and the nodes 902d correspond to points surveyed using a fourth laser emitter (e.g., index 3).

In general, each node can have, as a parent node, the most recent node that is associated with the same laser index i (e.g., forming a branch having a common laser index i). If such a node is not available, the current node can use, as a parent node, a node with a different laser index j with a minimum prediction residual.

In some embodiments, the prediction tree can be encoded and/or decoded by traversing the tree in a predefined order (e.g., depth first, breath first). As an example, in depth first traversal, a branch is traversed in full, prior to traversing other branches. Branches are traversed in full until all of the branches have been traversed. As another example, in breach first traversal, nodes of one hierarchical level (e.g., a higher level) are traversed first, prior to traversing nodes of another hierarchical level (e.g., a lower level). Levels are traversed in full until all of the levels have been traversed.

Other Coordinate Systems

In the examples described herein, Cartesian coordinates (x, y, z) and are encoded as quantized spherical coordinates ($\tilde{r}, \tilde{\phi}, i$). However, in practice, coordinates of any coordinate system can be encoded and/or quantized as coordinates of any other coordinate system. For example, Cartesian coordinates (x, y, z) can be encoded and/or quantized as coordinates (x, y, i), (x, r, i), (x, $\tilde{\phi}$, i), (y, r, i), (y, $\tilde{\phi}$, i), or any other coordinates according to any coordinate system. As another example, these encoded and/or quantized coordinates can be decoded to obtain Cartesian coordinates (x, y, z) again.

In some embodiments, an encoder and decoder can switch between different coordinate system representations at a sequence, frame, and/or sub-region (e.g., block) level. In some embodiments, the decision to switch between the different representations can be explicitly signaled in the bitstream with syntax elements provided at a sequence/frame/block level. In some embodiments, the decision to switch between the different representations can be an implicit strategy shared by the encoder and decoder In some embodiments, the decision to switch between the different representations can be made based on RD performance and/or computational complexity at the encoder/decoder side.

Example Processes

FIG. 10A shows an example process 1000 for encoding information regarding a plurality of points in a three-dimensional point cloud. The process 1000 can be performed, at least in part, using one or more computer modules and/or devices (e.g., one or more of the modules and/or computer systems shown in FIGS. 13A and 14).

According to the process 1000, a computer system receives first data regarding a plurality of points in a three-dimensional point cloud (step 1002). The first data is based on one or more measurements obtained by a sensor system. The first data includes first spatial coordinates of at least some of the points according to a first coordinate system. In some embodiments, the first coordinate system can be a Cartesian coordinate system.

The computer system determines second data regarding the plurality of points based on the first data (step 1004). The second data includes second spatial coordinates of at least some of the points according to a second coordinate system different from the first coordinate system. In some embodiments, the second coordinate system can be a spherical coordinate system.

The second data also includes one or more quantization parameters associated with the second spatial coordinates. The second spatial coordinates can be quantized according to the one or more quantization parameters. In some embodiments, the one or more quantization parameters can include one or more quantization step sizes with respect to one or more dimensions of the second coordinate system.

The computer system encodes the second data (step 1006). Encoding the second data includes generating a prediction tree having a plurality of nodes. A value of each node in the prediction tree represents the second spatial coordinates of a respective one of the plurality of points. The value of at least a first node in the prediction tree is determined based on the value of one or more ancestor nodes of the first node and one or more properties of the sensor system.

In some embodiments, the sensor system can include one or more light detection and ranging (LIDAR) sensors (e.g., one or more of the LIDAR systems 700 shown in FIG. 7). In some embodiments, one or more properties of the sensor system can represent a rotational speed of one or more light emitters in the one or more LIDAR sensors (e.g., a rotational speed of the scanning module 702 shown in FIG. 7). In some embodiments, the one or more properties of the sensor system can represent a physical arrangement of one or more light emitters in the one or more LIDAR sensors (e.g., a physical arrangement of the light emitters 702 shown in FIG. 7). In some embodiments, the one or more properties of the sensor system can represent a pattern of emission of one or more light emitters in the one or more LIDAR sensors (e.g., a pattern of the light beams emitted by the light emitters 702 shown in FIG. 7).

In some embodiments, the plurality of nodes of the prediction tree can arranged according to a plurality of branches, where each branch corresponds to a different light emitter in the one or more LIDAR sensors. As an illustrative example, a simplified prediction tree 900 is shown in FIG. 9.

In some embodiments, the second data can include one or more residual values. The one or more residual values can be determined based on a difference between (i) a first location of a point represented one or more of the first spatial coordinates for that point and (ii) a second location of that point estimated based on one or more of the second spatial coordinates for that point. In some embodiments, encoding the second data can include storing the plurality of residual values.

Figure 10B:
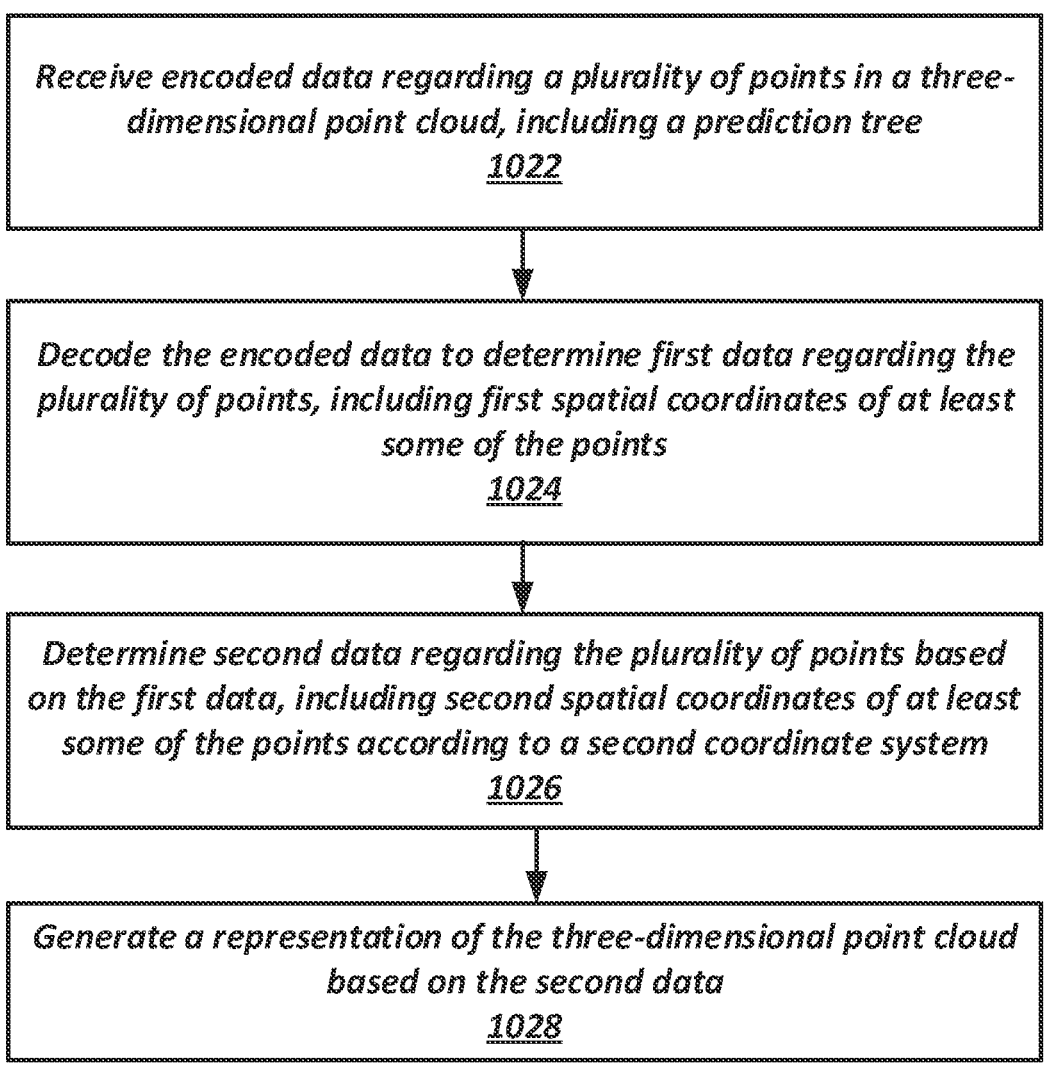
FIG. 10B is a flowchart diagram of an example process for decoding encoded information regarding a plurality of points in a three-dimensional point cloud.

FIG. 10B shows an example process 1020 for decoding encoded information regarding a plurality of points in a three-dimensional point cloud. The process 1020 can be performed, at least in part, using one or more computer modules and/or devices (e.g., one or more of the modules and/or computer systems shown in FIGS. 13B and 14).

According to the process 1020, a computer system receives encoded data regarding a plurality of points in a three-dimensional point cloud (step 1022). The encoded data includes a prediction tree having a plurality of nodes generated based on spatial information regarding the plurality of points. The encoded data also includes an indication representing one or more properties of a sensor system that obtained the spatial information.

A value of each node in the prediction tree represents first spatial coordinates of a respective one of the plurality of points according to a first coordinate system. The value of at least a first node in the prediction tree is determined based on a value of one or more ancestor nodes of the first node and the one or more properties of the sensor system. In some embodiments, the first coordinate system can be a spherical coordinate system.

In some embodiments, the sensor system can include one or more light detection and ranging (LIDAR) sensors (e.g., one or more of the LIDAR systems 700 shown in FIG. 7). In some embodiments, one or more properties of the sensor system can represent a rotational speed of one or more light emitters in the one or more LIDAR sensors (e.g., a rotational speed of the scanning module 702 shown in FIG. 7). In some embodiments, the one or more properties of the sensor system can represent a physical arrangement of one or more light emitters in the one or more LIDAR sensors (e.g., a physical arrangement of the light emitters 702 shown in FIG. 7). In some embodiments, the one or more properties of the sensor system can represent a pattern of emission of one or more light emitters in the one or more LIDAR sensors (e.g., a pattern of the light beams emitted by the light emitters 702 shown in FIG. 7).

In some embodiments, the plurality of nodes of the prediction tree can be arranged according to a plurality of branches, where each branch corresponds to a different light emitter in the one or more LIDAR sensors. As an illustrative example, a simplified prediction tree 900 is shown in FIG. 9.

The computer system decodes the encoded data to determine first data regarding the plurality of points (step 1024). The first data includes the first spatial coordinates of at least some of the points. The first data also includes one or more quantization parameters associated with the first spatial coordinates.

The first spatial coordinates can be scaled according to the one or more quantization parameters. In some embodiments, the one or more quantization parameters can include one or more quantization step sizes with respect to one or more dimensions of the first coordinate system.

In some embodiments, the second data can include one or more first residual values. Determining the second data can include decoding a second residual value according to the second coordinate system, and adding the one or more first residual values to the second residual value.

In some embodiments, the plurality of nodes of the prediction tree can arranged according to a plurality of branches. Decoding the encoded data can include decoding each of the nodes of a first branch prior to decoding each of the nodes of second branches (e.g., depth first decoding).

In some embodiments, the plurality of nodes of the prediction tree can be arranged according to a plurality of branches. Decoding the encoded data can include prioritizing a decoding of the nodes according to a hierarchical level of each of the nodes in the prediction tree (e.g., breadth first decoding).

The computer system determines second data regarding the plurality of points based on the first data (step 1026). The second data includes second spatial coordinates of at least some of the points according to a second coordinate system different from the first coordinate system. In some embodiments, the second coordinate system can be a Cartesian coordinate system.

The computer system generates a representation of the three-dimensional point cloud based on the second data (step 1028). In some embodiments, the representation can be a graphical representation, such as a graphical rendering of the three-dimensional point cloud. In some embodiments, generating the representation of the three-dimensional point cloud can include generating virtual reality content and/or augmented reality content that includes at least a portion of the point cloud.

Figure 11:
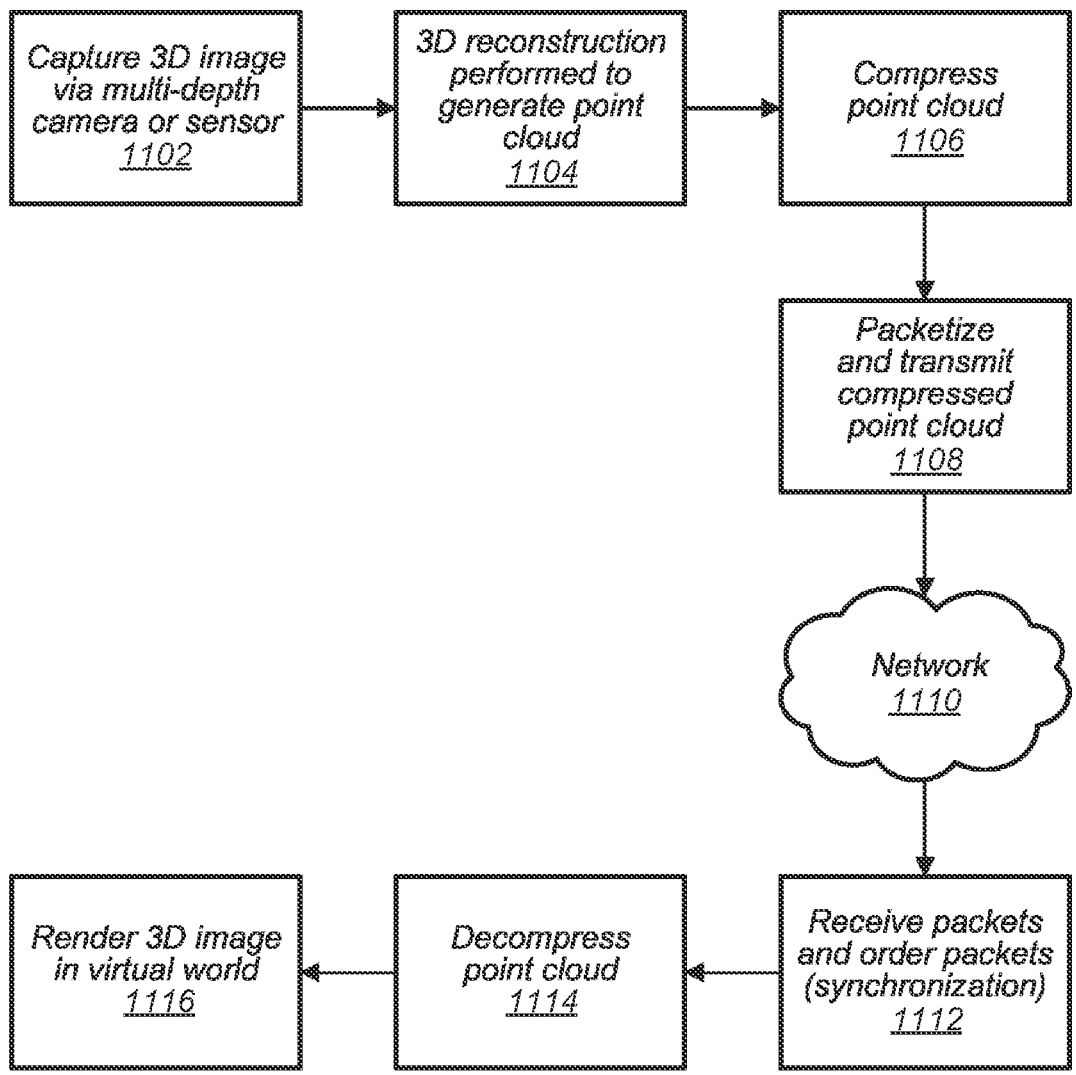
FIG. 11 is a flowchart diagram of an example technique for using compressed point cloud information in a 3-D application.

FIG. 11 illustrates compressed point clouds being used in a 3-D application.

In some embodiments, a sensor, such as the sensor 102, an encoder, such as the encoder 104, and a decoder, such as the decoder 116, can be used to communicate point clouds in a 3-D application. For example, a sensor, such as the sensor 102, at step 1102 can capture a 3D image and at step 1104, the sensor or a processor associated with the sensor can perform a 3D reconstruction based on sensed data to generate a point cloud.

At step 1106, an encoder such as the encoder 104 can compress the point cloud and at step 1108 the encoder or a post processor can packetize and transmit the compressed point cloud, via a network 1110. At step 1112, the packets can be received at a destination location that includes a decoder, such as the decoder 116. The decoder can decompress the point cloud at step 1114 and the decompressed point cloud can be rendered at step 1116. In some embodiments, a 3-D application can transmit point cloud data in real time such that a display at step 1116 represents images being observed at step 1102. For example, a camera in a canyon can allow a remote user to experience walking through a virtual canyon at step 1116.

Figure 12:
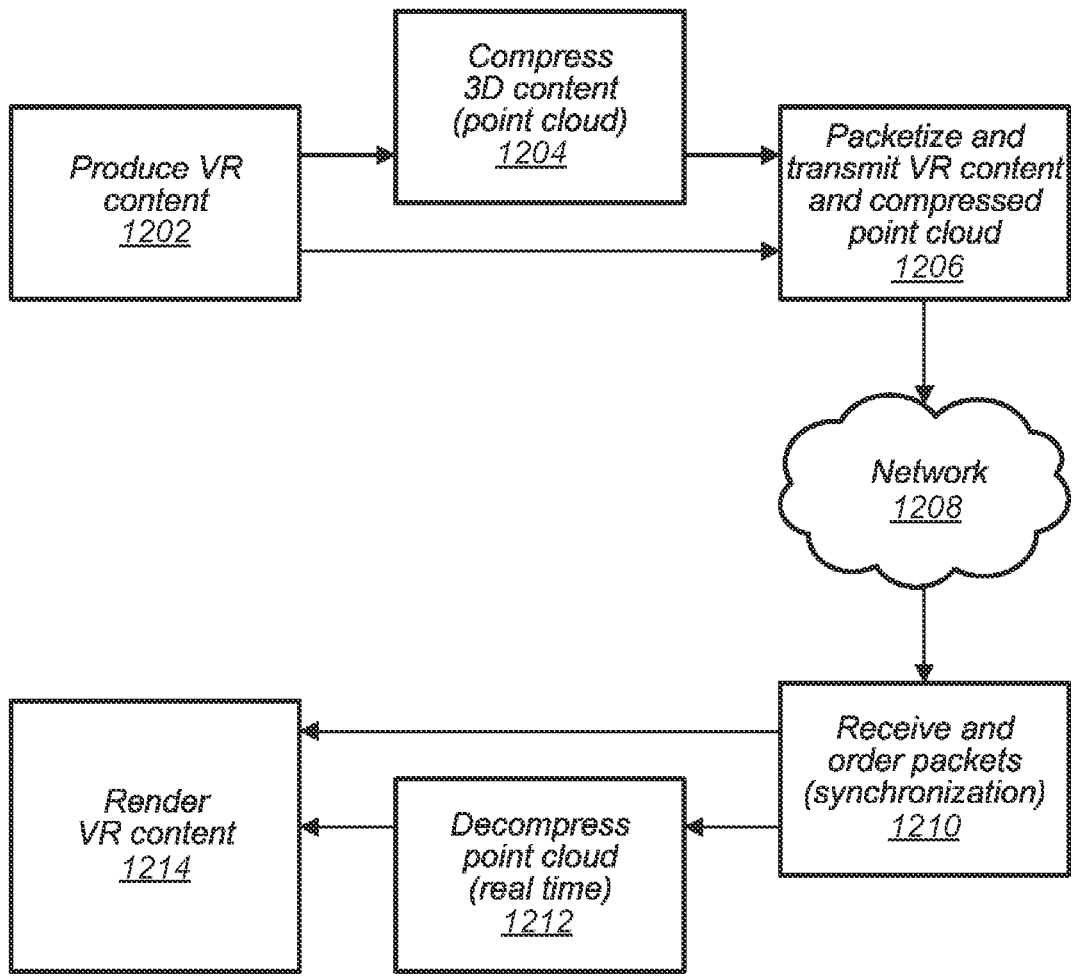
FIG. 12 is a flow chart diagram of an example technique for using compressed point cloud information in a virtual reality application.

FIG. 12 illustrates compressed point clouds being used in a virtual reality (VR) or augmented reality (AR) application.

In some embodiments, point clouds may be generated in software (for example as opposed to being captured by a sensor). For example, at step 1202 virtual reality or augmented reality content is produced. The virtual reality or augmented reality content can include point cloud data and non-point cloud data. For example, a non-point cloud character can traverse a landscape represented by point clouds, as one example. At step 1204, the point cloud data can be compressed and at step 1206 the compressed point cloud data and non-point cloud data can be packetized and transmitted via a network 1208. For example, the virtual reality or augmented reality content produced at step 1202 can be produced at a remote server and communicated to a virtual reality (VR) or augmented reality (AR) content consumer via the network 1208. At step 1210, the packets can be received and synchronized at the VR or AR consumer's device. A decoder operating at the VR or AR consumer's device can decompress the compressed point cloud at step 1212 and the point cloud and non-point cloud data can be rendered in real time, for example in a head mounted display of the VR or AR consumer's device. In some embodiments, point cloud data can be generated, compressed, decompressed, and rendered responsive to the VR or AR consumer manipulating the head mounted display to look in different directions.

In some embodiments, point cloud compression as described herein can be used in various other applications, such as geographic information systems, sports replay broadcasting, museum displays, autonomous navigation, etc.

Example Encoder and Decoder

Figure 13A:
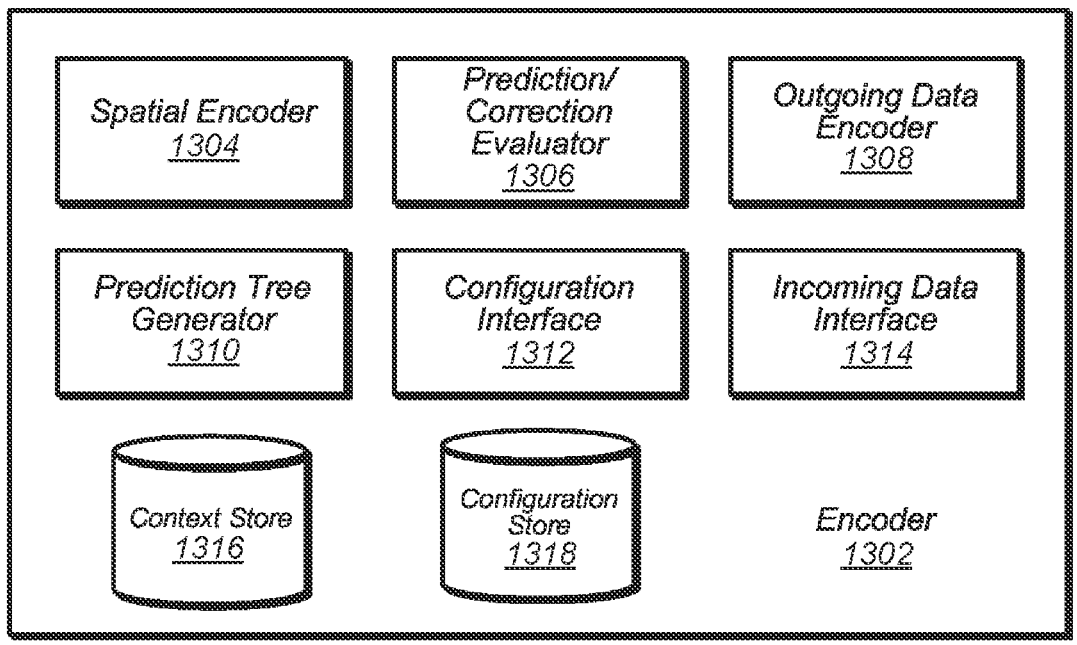
FIG. 13A is a diagram of an example encoder.

FIG. 13A illustrates components of an example encoder 1302. The encoder 1302 can be a similar encoder as the encoder 104 illustrated in FIG. 1A. The encoder 1302 includes a spatial encoder 1304, an octree tree generator 1310, a prediction/correction evaluator 1306, an incoming data interface 1314, and an outgoing data interface 1308. The encoder 1302 also includes a context store 1316 and a configuration store 1318.

In some embodiments, a spatial encoder, such as the spatial encoder 1304, can compress spatial information associated with points of a point cloud, such that the spatial information can be stored or transmitted in a compressed format. In some embodiments, a spatial encoder, such as spatial encoder 1304, can utilize octrees to compress spatial information for points of a point cloud.

In some embodiments, compressed spatial information can be stored or transmitted with compressed attribute information or can be stored or transmitted separately. In either case, a decoder receiving compressed attribute information for points of a point cloud can also receive compressed spatial information for the points of the point cloud, or can otherwise obtain the spatial information for the points of the point cloud.

A prediction tree generator, such as the prediction tree generator 1310, can implement various techniques discussed herein to generate a prediction tree for storing information regarding a point cloud.

A prediction/correction evaluator, such as the prediction/correction evaluator 1306 of the encoder 1302, can determine predicted attribute values for points of a point cloud based on an inverse distance interpolation method using attribute values of the K-nearest neighboring points of a point for whom an attribute value is being predicted. The prediction/correction evaluator can also compare a predicted attribute value of a point being evaluated to an original attribute value of the point in a non-compressed point cloud to determine an attribute correction value. In some embodiments, a prediction/correction evaluator, such as the prediction/correction evaluator 1306 of the encoder 1302, can adaptively adjust a prediction strategy used to predict attribute values of points in a given neighborhood of points based on a measurement of the variability of the attribute values of the points in the neighborhood.

An outgoing data encoder, such as the outgoing data encoder 1308 of the encoder 1302, can encode attribute correction values and assigned attribute values included in a compressed attribute information file for a point cloud. In some embodiments, an outgoing data encoder, such as the outgoing data encoder 1308, can select an encoding context for encoding a value, such as an assigned attribute value or an attribute correction value, based on a number of symbols included in the value. In some embodiments, values with more symbols may be encoded using an encoding context including Golomb exponential encoding, whereas values with fewer symbols can be encoded using arithmetic encoding. In some embodiments, encoding contexts can include more than one encoding technique. For example, a portion of a value may be encoded using arithmetic encoding whereas another portion of the value can be encoded using Golomb exponential encoding. In some embodiments, an encoder, such as the encoder 1302, can include a context store, such as the context store 1316, that stores encoding contexts used by an outgoing data encoder, such as the outgoing data encoder 1308, to encode attribute correction values and assigned attribute values.

In some embodiments, an encoder, such as the encoder 1302, can also include an incoming data interface, such as the incoming data interface 1314. In some embodiments, an encoder can receive incoming data from one or more sensors that capture points of a point cloud or that capture attribute information to be associated with points of a point cloud. For example, in some embodiments, an encoder can receive data from an LIDAR system, 3-D-camera, 3-D scanner, etc. and can also receive data from other sensors, such as a gyroscope, accelerometer, etc. Additionally, an encoder can receive other data such as a current time from a system clock, etc. In some embodiments, such different types of data can be received by an encoder via an incoming data interface, such as the incoming data interface 1314 of the encoder 1302.

In some embodiments, an encoder, such as the encoder 1302, can further include a configuration interface, such as the configuration interface 1312, where one or more parameters used by the encoder to compress a point cloud can be adjusted via the configuration interface. In some embodiments, a configuration interface, such as the configuration interface 1312, can be a programmatic interface, such as an application programming interface (API). Configurations used by an encoder, such as the encoder 1302, can be stored in a configuration store, such as the configuration store 1318.

In some embodiments, an encoder, such as the encoder 1302, can include more or fewer components than shown in FIG. 13A.

Figure 13B:
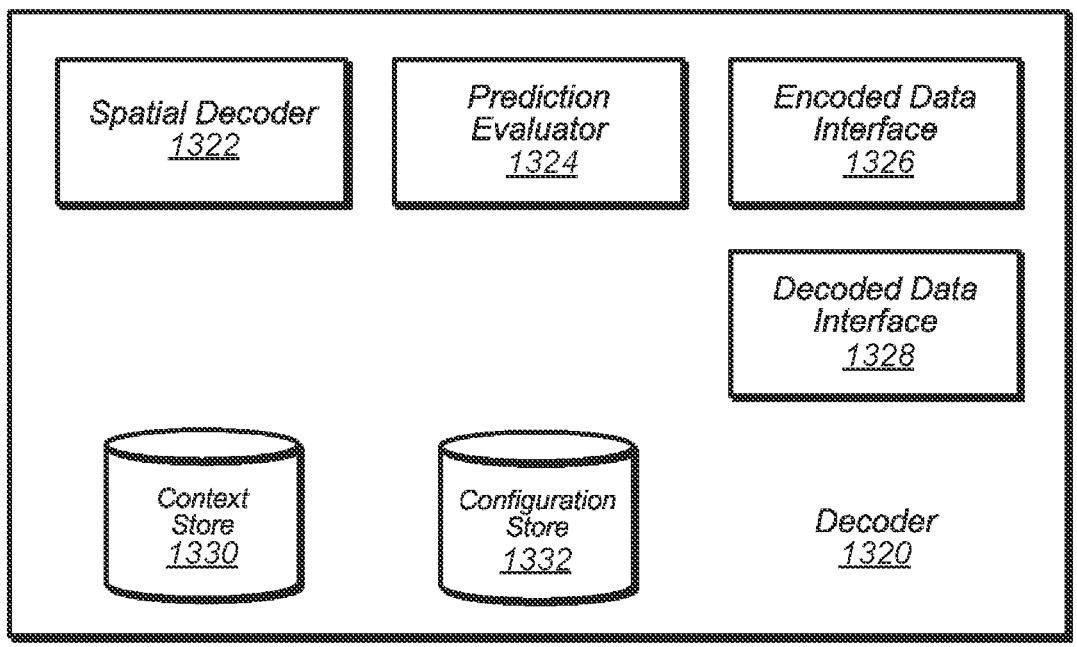
FIG. 13B is a diagram of an example decoder.

FIG. 13B illustrates components of an example decoder 1320.

The decoder 1320 can be a similar decoder as the decoder 116 illustrated in FIG. 1A. The decoder 1320 includes an encoded data interface 1326, a spatial decoder 1322, a prediction evaluator 1324, a context store 1330, a configuration store 1332, and a decoded data interface 1328.

A decoder, such as the decoder 1320, can receive an encoded compressed point cloud and/or an encoded compressed attribute information file for points of a point cloud. For example, a decoder, such as the decoder 1320, can receive a compressed attribute information file and/or a compressed spatial information file. The compressed attribute information file and/or compressed spatial information file can be received by a decoder via an encoded data interface, such as the encoded data interface 1326. The encoded compressed point cloud can be used by the decoder to determine spatial information for points of the point cloud. For example, spatial information of points of a point cloud included in a compressed point cloud can be generated by a spatial decoder, such as the spatial decoder 1322. In some embodiments, a compressed point cloud can be received via an encoded data interface, such as the encoded data interface 1326, from a storage device or other intermediary source, where the compressed point cloud was previously encoded by an encoder, such as the encoder 104. In some embodiments, an encoded data interface, such as the encoded data interface 1326, can decode spatial information. For example, the spatial information may have been encoded using various encoding techniques as described herein, such as the various techniques for encoding geometry or other spatial information and/or attribute information as a prediction tree.

A prediction evaluator of a decoder, such as the prediction evaluator 1324, can select a starting point of a minimum spanning tree based on an assigned starting point included in a compressed attribute information file. In some embodiments, the compressed attribute information file can include one or more assigned values for one or more corresponding attributes of the starting point. In some embodiments, a prediction evaluator, such as the prediction evaluator 1324, can assign values to one or more attributes of a starting point in a decompressed model of a point cloud being decompressed based on assigned values for the starting point included in a compressed attribute information file. A prediction evaluator, such as the prediction evaluator 1324, can further utilize the assigned values of the attributes of the starting point to determine attribute values of neighboring points. For example, a prediction evaluator can select a next nearest neighboring point to the starting point as a next point to evaluate, where the next nearest neighboring point is selected based on a shortest distance to a neighboring point from the starting point in the minimum spanning tree. Note that because the minimum spanning tree is generated based on the same or similar spatial information at the decoder as was used to generate a minimum spanning tree at an encoder, the decoder may determine the same evaluation order for evaluating the points of the point cloud being decompressed as was determined at the encoder by identifying next nearest neighbors in the minimum spanning tree.

A decoder, such as the decoder 1320, can provide a decompressed point cloud generated based on a received compressed point cloud and/or a received compressed attribute information file to a receiving device or application via a decoded data interface, such as the decoded data interface 1328. The decompressed point cloud can include the points of the point cloud and attribute values for attributes of the points of the point cloud. In some embodiments, a decoder can decode some attribute values for attributes of a point cloud without decoding other attribute values for other attributes of a point cloud. For example, a point cloud can include color attributes for points of the point cloud and can also include other attributes for the points of the point cloud, such as velocity, for example. In such a situation, a decoder can decode one or more attributes of the points of the point cloud, such as the velocity attribute, without decoding other attributes of the points of the point cloud, such as the color attributes.

In some embodiments, the decompressed point cloud and/or decompressed attribute information file can be used to generate a visual display, such as for a head mounted display. Also, in some embodiments, the decompressed point cloud and/or decompressed attribute information file can be provided to a decision making engine that uses the decompressed point cloud and/or decompressed attribute information file to make one or more control decisions. In some embodiments, the decompressed point cloud and/or decompressed attribute information file may be used in various other applications or for various other purposes.

Example Computer System

Figure 14:
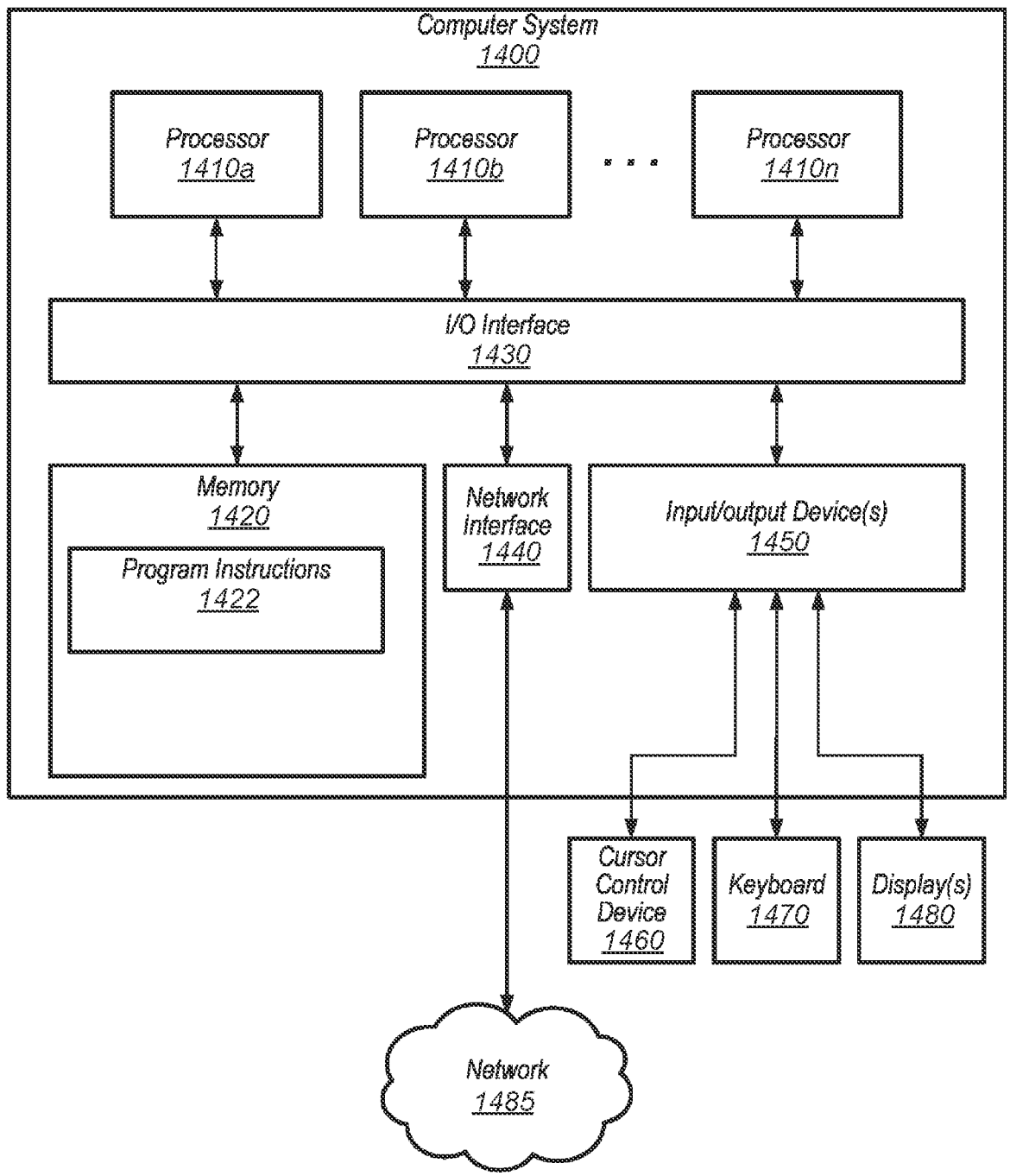
FIG. 14 is a diagram of an example computer system for implementing an encoder and/or a decoder.

FIG. 14 illustrates an example computer system 1400 that can implement an encoder or decoder or any other ones of the components or processes described herein, (e.g., any of the components and/or processes described above with reference to FIGS. 1-13). The computer system 1400 can be configured to execute any or all of the embodiments described above. In different embodiments, computer system 1400 can be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a point cloud encoder or decoder, as described herein can be executed in one or more computer systems 1400, which may interact with various other devices. Note that any component, action, or functionality described above with respect to FIGS. 1-13 can be implemented on one or more computers configured as computer system 1400 of FIG. 14. In the illustrated embodiment, the computer system 1400 includes one or more processors 1410 coupled to a system memory 1420 via an input/output (I/O) interface 1430. The computer system 1400 further includes a network interface 1440 coupled to I/O interface 1430, and one or more input/output devices 1450, such as cursor control device 1460, keyboard 1470, and display(s) 1480. In some cases, it is contemplated that embodiments can be implemented using a single instance of the computer system 1400, while in other embodiments multiple such systems, or multiple nodes making up the computer system 1400, can be configured to host different portions or instances of embodiments. For example, in one embodiment some elements can be implemented via one or more nodes of the computer system 1400 that are distinct from those nodes implementing other elements.

In various embodiments, the computer system 1400 can be a uniprocessor system including one processor 1410, or a multiprocessor system including several processors 1410 (e.g., two, four, eight, or another suitable number). The processors 1410 can be any suitable processor capable of executing instructions. For example, in various embodiments, the processors 1410 can be general-purpose or embedded processors implementing any of a variety of instruction set architectures (ISAs), such as the x86, PowerPC, SPARC, or MIPS ISAs, or any other suitable ISA. In multiprocessor systems, each of the processors 1410 can commonly, but not necessarily, implement the same ISA.

The system memory 1420 can be configured to store point cloud compression or point cloud decompression program instructions 1422 and/or sensor data accessible by the processor 1410. In various embodiments, the system memory 1420 can be implemented using any suitable memory technology, such as static random access memory (SRAM), synchronous dynamic RAM (SDRAM), nonvolatile/Flash-type memory, or any other type of memory. In the illustrated embodiment, program instructions 1422 can be configured to implement an image sensor control application incorporating any of the functionality described above. In some embodiments, program instructions and/or data may be received, sent or stored upon different types of computer-accessible media or on similar media separate from the system memory 1420 or the computer system 1400. While the computer system 1400 is described as implementing the functionality of functional blocks of previous drawings, any of the functionality described herein can be implemented via such a computer system.

In some embodiments, the I/O interface 1430 can be configured to coordinate I/O traffic between the processor 1410, the system memory 1420, and any peripheral devices in the device, including the network interface 1440 or other peripheral interfaces, such as the input/output devices 1450. In some embodiments, the I/O interface 1430 can perform any necessary protocol, timing or other data transformations to convert data signals from one component (e.g., the system memory 1420) into a format suitable for use by another component (e.g., the processor 1410). In some embodiments, the I/O interface 1430 can include support for devices attached through various types of peripheral buses, such as a variant of the Peripheral Component Interconnect (PCI) bus standard or the Universal Serial Bus (USB) standard, for example. In some embodiments, the function of I/O interface 1430 can be split into two or more separate components, such as a north bridge and a south bridge, for example. Also, in some embodiments some or all of the functionality of the I/O interface 1430, such as an interface to the system memory 1420, can be incorporated directly into the processor 1410.

The network interface 1440 can be configured to allow data to be exchanged between the computer system 1400 and other devices attached to a network 1485 (e.g., carrier or agent devices) or between nodes of the computer system 1400. The network 1485 can in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, the network interface 1440 can support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

The input/output devices 1450 can, in some embodiments, include one or more display terminals, keyboards, keypads, touchpads, scanning devices, voice or optical recognition devices, or any other devices suitable for entering or accessing data by one or more of the computer systems 1400. Multiple input/output devices 1450 can be present in the computer system 1400 or can be distributed on various nodes of the computer system 1400. In some embodiments, similar input/output devices can be separate from the computer system 1400 and can interact with one or more nodes of the computer system 1400 through a wired or wireless connection, such as over the network interface 1440.

As shown in FIG. 14, memory 1420 can include program instructions 1422, which can be processor-executable to implement any element or action described above. In some embodiments, the program instructions can implement the methods described herein. In other embodiments, different elements and data can be included. Note that data may include any data or information described herein.

Those skilled in the art will appreciate that the computer system 1400 is merely illustrative and is not intended to limit the scope of embodiments. In particular, the computer system and devices can include any combination of hardware or software that can perform the indicated functions, including computers, network devices, Internet appliances, PDAs, wireless phones, pagers, etc. The computer system 1400 can also be connected to other devices that are not illustrated, or instead may operate as a stand-alone system. In addition, the functionality provided by the illustrated components can in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software components can execute in memory on another device and communicate with the illustrated computer system via inter-computer communication. Some or all of the system components or data structures can also be stored (e.g., as instructions or structured data) on a computer-accessible medium or a portable article to be read by an appropriate drive, various examples of which are described above. In some embodiments, instructions stored on a computer-accessible medium separate from the computer system 1400 can be transmitted to computer system 1400 via transmission media or signals such as electrical, electromagnetic, or digital signals, conveyed via a communication medium such as a network and/or a wireless link. Various embodiments can further include receiving, sending or storing instructions and/or data implemented in accordance with the foregoing description upon a computer accessible medium. Generally speaking, a computer-accessible medium can include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium can include transmission media or signals such as electrical, electromagnetic, or digital signals, conveyed via a communication medium such as network and/or a wireless link.

The methods described herein can be implemented in software, hardware, or a combination thereof, in different embodiments. In addition, the order of the blocks of the methods can be changed, and various elements may be added, reordered, combined, omitted, modified, etc. Various modifications and changes can be made as would be obvious to a person skilled in the art having the benefit of this disclosure. The various embodiments described herein are meant to be illustrative and not limiting. Many variations, modifications, additions, and improvements are possible. Accordingly, plural instances can be provided for components described herein as a single instance. Boundaries between various components, operations and data stores are provided as illustrative examples in the context of specific illustrative configurations. Other allocations of functionality are envisioned and may fall within the scope of claims that follow. Finally, structures and functionality presented as discrete components in the example configurations can be implemented as a combined structure or component. These and other variations, modifications, additions, and improvements may fall within the scope of embodiments as defined in the claims that follow.

What is claimed is:

1. A method comprising:
   receiving, by a computer system, first data regarding a plurality of points in a three-dimensional point cloud, wherein the first data is based on one or more measurements obtained by a sensor system, and wherein the first data comprises first spatial coordinates of at least some of the points according to a first coordinate system;
   determining, by the computer system, second data regarding the plurality of points based on the first data, wherein the second data comprises:
      second spatial coordinates of at least some of the points according to a second coordinate system different from the first coordinate system, and
      one or more quantization parameters associated with the second spatial coordinates; and
   encoding, by the computer system, the second data, wherein encoding the second data comprises generating a prediction tree having a plurality of nodes,
   wherein a value of each node in the prediction tree represents the second spatial coordinates of a respective one of the plurality of points, and
   wherein the value of at least a first node in the prediction tree is determined by predicting a position of a first point associated with the first node based on the value of one or more ancestor nodes of the first node and one or more properties of the sensor system,
   wherein the sensor system comprises one or more light detection and ranging (LIDAR) sensors, and wherein the one or more properties of the sensor system comprise at least one of:
      a rotational speed of one or more light emitters in the one or more LIDAR sensors,
      a physical arrangement of one or more light emitters in the one or more LIDAR sensors, or
      a pattern of emission of one or more light emitters in the one or more LIDAR sensors.

2. The method of claim 1, wherein the first coordinate system is a Cartesian coordinate system.

3. The method of claim 2, wherein the second coordinate system is a spherical coordinate system.

4. The method of claim 1, wherein the second spatial coordinates are quantized according to the one or more quantization parameters.

5. The method of claim 4, wherein the one or more quantization parameters comprise one or more quantization step sizes with respect to one or more dimensions of the second coordinate system.

6. The method of claim 1, wherein the plurality of nodes of the prediction tree are arranged according to a plurality of branches, and wherein each branch corresponds to a different light emitter in the one or more LIDAR sensors.

7. The method of claim 1, wherein the second data comprises one or more residual values, wherein the one or more residual values are determined based on a difference between (i) a first location of a point represented by one or more of the first spatial coordinates for that point and (ii) a second location of that point estimated based on one or more of the second spatial coordinates for that point.

8. The method of claim 7, wherein encoding the second data comprises storing the one or more residual values.

9. A device comprising:
   one or more processors; and
   memory storing instructions that when executed by the one or more processors, cause the one or more processors to perform operations comprising:
   receiving first data regarding a plurality of points in a three-dimensional point cloud, wherein the first data is based on one or more measurements obtained by a sensor system, and wherein the first data comprises first spatial coordinates of at least some of the points according to a first coordinate system;
   determining second data regarding the plurality of points based on the first data, wherein the second data comprises:
      second spatial coordinates of at least some of the points according to a second coordinate system different from the first coordinate system, and
      one or more quantization parameters associated with the second spatial coordinates; and
   encoding the second data, wherein encoding the second data comprises generating a prediction tree having a plurality of nodes,
   wherein a value of each node in the prediction tree represents the second spatial coordinates of a respective one of the plurality of points, and
   wherein the value of at least a first node in the prediction tree is determined by predicting a position of a first point associated with the first node based on the value of one or more ancestor nodes of the first node and one or more properties of the sensor system,
   wherein the sensor system comprises one or more light detection and ranging (LIDAR) sensors, and wherein the one or more properties of the sensor system comprise at least one of:
      a rotational speed of one or more light emitters in the one or more LIDAR sensors,
      a physical arrangement of one or more light emitters in the one or more LIDAR sensors, or
      a pattern of emission of one or more light emitters in the one or more LIDAR sensors.

10. The device of claim 9, wherein the first coordinate system is a Cartesian coordinate system.

11. The device of claim 10, wherein the second coordinate system is a spherical coordinate system.

12. The device of claim 9, wherein the second spatial coordinates are quantized according to the one or more quantization parameters.

13. The device of claim 12, wherein the one or more quantization parameters comprise one or more quantization step sizes with respect to one or more dimensions of the second coordinate system.

14. The device of claim 9, wherein the plurality of nodes of the prediction tree are arranged according to a plurality of branches, and wherein each branch corresponds to a different light emitter in the one or more LIDAR sensors.

15. The device of claim 9, wherein the second data comprises one or more residual values, wherein the one or more residual values are determined based on a difference between (i) a first location of a point represented by one or more of the first spatial coordinates for that point and (ii) a second location of that point estimated based on one or more of the second spatial coordinates for that point.

16. The device of claim 15, wherein encoding the second data comprises storing the one or more residual values.

17. One or more non-transitory, computer-readable storage media having instructions stored thereon, that when executed by one or more processors, cause the one or more processors to perform operations comprising:
receiving first data regarding a plurality of points in a three-dimensional point cloud, wherein the first data is based on one or more measurements obtained by a sensor system, and wherein the first data comprises first spatial coordinates of at least some of the points according to a first coordinate system;
determining second data regarding the plurality of points based on the first data, wherein the second data comprises:
second spatial coordinates of at least some of the points according to a second coordinate system different from the first coordinate system, and
one or more quantization parameters associated with the second spatial coordinates; and
encoding the second data, wherein encoding the second data comprises generating a prediction tree having a plurality of nodes,
wherein a value of each node in the prediction tree represents the second spatial coordinates of a respective one of the plurality of points, and
wherein the value of at least a first node in the prediction tree is determined by predicting a position of a first point associated with the first node based on the value of one or more ancestor nodes of the first node and one or more properties of the sensor system,
wherein the sensor system comprises one or more light detection and ranging (LIDAR) sensors, and wherein the one or more properties of the sensor system comprise at least one of:
a rotational speed of one or more light emitters in the one or more LIDAR sensors,
a physical arrangement of one or more light emitters in the one or more LIDAR sensors, or
a pattern of emission of one or more light emitters in the one or more LIDAR sensors.

18. The one or more non-transitory, computer-readable storage media of claim 17, wherein the first coordinate system is a Cartesian coordinate system, and wherein the second coordinate system is a spherical coordinate system.

19. The one or more non-transitory, computer-readable storage media of claim 17, wherein the second spatial coordinates are quantized according to the one or more quantization parameters, and wherein the one or more quantization parameters comprise one or more quantization step sizes with respect to one or more dimensions of the second coordinate system.

20. The one or more non-transitory, computer-readable storage media of claim 17, wherein the plurality of nodes of the prediction tree are arranged according to a plurality of branches, wherein each branch corresponds to a different light emitter in the one or more LIDAR sensors,
wherein the second data comprises one or more residual values, wherein the one or more residual values are determined based on a difference between (i) a first location of a point represented by one or more of the first spatial coordinates for that point and (ii) a second location of that point estimated based on one or more of the second spatial coordinates for that point, and
wherein encoding the second data comprises storing the plurality of residual values.

* * * * *